US012126099B2

(12) United States Patent
Gaya et al.

(10) Patent No.: US 12,126,099 B2
(45) **Date of Patent: *Oct. 22, 2024**

(54) PTFE-BASED SEGMENTED PATCH ANTENNA

(71) Applicant: KING FAHD UNIVERSITY OF PETROLEUM AND MINERALS, Dhahran (SA)

(72) Inventors: Sagiru Mukhtar Gaya, Dhahran (SA); Hussein Attia, Dhahran (SA); Oludayo Sokunbi, Dhahran (SA); Abubakar Hamza, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,321

(22) Filed: Mar. 26, 2024

(65) Prior Publication Data

US 2024/0235032 A1 Jul. 11, 2024

Related U.S. Application Data

(63) Continuation of application No. 17/879,847, filed on Aug. 3, 2022, now Pat. No. 11,984,671.

(51) Int. Cl.
*H01Q 9/04* (2006.01)

(52) U.S. Cl.
CPC ................................ *H01Q 9/0442* (2013.01)

(58) Field of Classification Search
CPC .... H01Q 9/0442; H01Q 9/0407; H01Q 13/10; H01Q 19/005; H01Q 21/065
See application file for complete search history.

(56) References Cited

U.S. PATENT DOCUMENTS

| | | | | |
|---|---|---|---|---|
| 2007/0216594 | A1 | 9/2007 | Uno | |
| 2019/0006766 | A1 | 1/2019 | Yonei et al. | |
| 2019/0089069 | A1* | 3/2019 | Niroo | H01Q 13/10 |
| 2019/0260115 | A1 | 8/2019 | Tehran et al. | |
| 2021/0005975 | A1 | 1/2021 | Hussain | |
| 2021/0296764 | A1* | 9/2021 | Shams | H01Q 3/385 |

FOREIGN PATENT DOCUMENTS

| | | | |
|---|---|---|---|
| CN | 102904022 | A | 1/2013 |
| CN | 105826667 | A | 8/2016 |
| CN | 109390699 | * | 11/2018 |
| CN | 110611163 | A | 12/2019 |
| EP | 2117078 | A | 11/2009 |

OTHER PUBLICATIONS

Panusa, et al.; Quad Band H-slot Microstrip Patch Antenna for WIMAX Application ; International Journal of Computer Applications, vol. 103, No. 12 ; Oct. 2014 ; 3 Pages.

* cited by examiner

*Primary Examiner* — Awat M Salih
(74) *Attorney, Agent, or Firm* — Oblon, McClelland, Maier & Neustadt, L.L.P.

(57) ABSTRACT

A segmented patch antenna is described. The segmented patch antenna comprises two rectangular parasitic elements. Each parasitic element comprises an integrated diode. The segmented patch antenna further comprises a main rectangular patch segment. The main rectangular patch segment comprises 3 slots, 2 slits and 3 diodes, respectively. The segmented patch antenna is suitable for use in multiple frequencies between 4.1 GHz and 5.7 GHz inclusive and configurable to operate in 12 independent modes.

19 Claims, 17 Drawing Sheets

PTFE-BASED SEGMENTED PATCH ANTENNA

CROSS-REFERENCE TO RELATED APPLICATIONS

The present application is a Continuation of U.S. application Ser. No. 17/879,847, now allowed, having a filing date of Aug. 3, 2022.

BACKGROUND

Technical Field

The present disclosure is directed to a reconfigurable patch antenna, and more particularly relates to a frequency and pattern reconfigurable segmented patch antenna for WiMAX applications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

WiMAX, also known as worldwide interoperability for microwave access, is a broadband wireless technology that is effective for providing wireless data transmission over long distances in a variety of ways, for example, from point-to-point link to full mobile cellular type access. WiMAX can provide high-speed data communication with an ability to maintain dedicated links, broadband connectivity and VoIP services. WiMAX is based on a broadband wireless access standard set by the Institute of Electrical and Electronics Engineers (IEEE 802.16) that acts as an alternative to cable and DSL. WiMAX is increasingly appearing as a promising option of wireless replacement for wired broadband. Range is important factor for WiMAX technology because a single WiMAX tower can connect to other WiMAX towers through a line-of-sight microwave link.

Patch antennas have the capability to reconfigure frequency bands and radiation patterns and have attracted interest for wireless applications. Patch antennas are useful for operating in more than one frequency band. In a patch antenna, frequency reconfigurability is achieved by varying the length of the antenna using a PIN diode. Also, radiation pattern reconfigurability is achieved with a use of parasitic elements.

Patch antennas for frequency and radiation pattern reconfigurability have been reported in the literature. For example, a rhombus-shaped patch radiator with integrated 6 PIN diodes was shown to provide 5.2 GHz and 8.8 GHz at two different radiating patterns, i.e., –45°/45° at 2 modes with 2 bands [see Y. P. Selvam, L. Elumalai, M. G. N. Alsath, M. Kanagasabai, S. Subbaraj, and S. Kingsly, "Novel frequency- and pattern-reconfigurable rhombic patch antenna with switchable polarization," IEEE Antennas and Wireless Propagation Letters, vol. 16, pp. 1639-1642, 2017]. Here, the mode refers to the direction the antenna could direct its beam or radiation pattern. In another example, a patch antenna includes 5 PIN diodes placed to realize two frequency bands operating at 2.4 and 5.4 GHz at two different beam patterns, i.e., 2 modes with 2 bands [see P. K. Li, Z. H. Shao, Q. Wang, and Y. J. Cheng, "Frequency- and pattern reconfigurable antenna for multistandard wireless applications," IEEE Antennas and Wireless Propagation Letters, vol. 14, pp. 333-336, 2015]. In another example, a patch antenna includes 8 PIN diodes loaded on a radiating patch to achieve 1.9 and 2.4 GHz resonance, with 2 omnidirectional switching beams at each resonance frequency, i.e., 4 modes with 2 bands, wherein the frequency and pattern reconfigurability is achieved by two shorting screws placed symmetrically and asymmetrically to modify the radiating elements [see S. Y. Z. Zhu, P. Wang and P. Gao, "A flexible frequency and pattern reconfigurable antenna for wireless systems," Progress In Electromagnetics Research Letters, vol. 76, pp. 63-70, 2018]. Other patch antenna configurations have been reported in the art. For example, a microstrip patch antenna with 2 varactor diodes achieves 3 resonant frequency bands from 2.68-3.51 GHz with a broadside and monopole-like radiation patterns, that is, 2 modes with 3 bands. [see N. Nguyen-Trong, L. Hall, and C. Fumeaux, "A frequency- and pattern re configurable center-shorted microstrip antenna," IEEE Antennas and Wireless Propagation Letters, vol. 15, pp. 1955-1958, 2016]. In another example, the removal of two slits from a rectangular patch antenna has been reported in the art that couples with 4 PIN diodes. The antenna permits 4 operating frequencies at 4.5, 4.8, 5.2, 5.8 GHz, and 3 different radiation pattern, i.e., 3 modes with 4 bands. [see Y. P. Selvam, M. Kanagasabai, M. G. N. Alsath, S. Velan, S. Kingsly, S. Subbaraj, Y. V. Ramana Rao, R. Srinivasan, A. K. Varadhan, and M. Karuppiah, "A low-profile frequency- and pattern-reconfigurable antenna," IEEE Antennas and Wireless Propagation Letters, vol. 16, pp. 3047-3050, 2017.] In another example, a patch antenna provides 6 different radiation patterns at frequency bands of 2.6 GHz and 3.5 GHz by using 6 pin diodes over an aperture-coupled stacked microstrip array antenna. The antenna provides 6 mode with 2 bands. Frequency and radiation pattern reconfigurability was achieved by changing the lengths of the feedline and radiating elements. [see N. Ramli, M. T. Ali, M. T. Islam, A. L. Yusof, and S. Muhamud-Kayat, "Aperture-coupled frequency and patterns reconfigurable microstripstacked array antenna," IEEE Transactions on Antennas and Propagation, vol. 63, no. 3, pp. 1067-1074, March 2015]. In another example, 2 varactor diodes are integrated with loaded stubs on 2 patch antenna array antennas has also been disclosed in the art. By changing the bias voltages of the varactor diodes, 3 tuning range of 2.15, 2.27, 2.38 GHz and also 3 radiation pattern angles at each tuning frequency were achieved, thus making the antenna work in 9 different modes with 3 frequency band. [see S. N. M. Zainarry, N. Nguyen-Trong, and C. Fumeaux, "A frequency and pattern-reconfigurable two-element array antenna," IEEE Antennas and Wireless Propagation Letters, vol. 17, no. 4, pp. 617-620, April 2018].

Each of the aforementioned antennas suffer from one or more drawbacks hindering their adoption. For example, aforementioned patch antennas designs could achieve up to 9 operational modes with 3 frequency bands with the help of 2 switches having small or no differences in the resonance frequencies, thus making the frequencies not completely independent and less operationally useful. Also, some designs in which high frequency reconfigurability is achieved, that is, more number of supported frequency bands, the number of modes supported by the antenna are less, thus limiting the radiation pattern of the antenna. Also, most conventional patch antennas include a high number of switches to achieve high frequency reconfigurability which in turn impacts the cost of the antenna. Conventional patch antennas are large and when configured to smaller size provide 7 or less operational modes. If the number of switches is increased to achieve high frequency reconfigurability, the antenna may fail to provide a greater number of radiation patterns or modes of operation.

Therefore, it is an object of the present disclosure to provide a highly compact patch antenna design that is capable of providing high frequency reconfigurability, that is, more resonating bands along with high number of operational modes and corresponding radiation patterns, with a decreased number of switches that is useful in WiMax applications in multipath environment.

SUMMARY

In an exemplary embodiment, a frequency and pattern reconfigurable segmented patch antenna for WiMAX applications is described herein. The segmented patch antenna includes two rectangular parasitic elements. Each parasitic element comprises an integrated diode. The segmented patch antenna includes a main rectangular patch segment. The main rectangular patch segment includes 3 slots, 2 slits and 3 diodes. The segmented patch antenna is suitable for use in multiple frequencies between 4.1 GHz and 5.7 GHz inclusive and configurable to operate in 12 independent modes.

In another exemplary embodiment, the segmented patch antenna further includes 4 biasing lines having length and width of each biasing line between 7 and 8 mm and between 1 and 3 mm, respectively.

In another exemplary embodiment, each of the 4 biasing lines further include a limiting resistor and a choke inductor.

In another exemplary embodiment, the main rectangular patch segment has one edge of length between 26 and 28 mm and a second edge of length between 21 and 23 mm.

In another exemplary embodiment, the slots are of width 0.6 mm (±0.1 mm), and the slits are no larger than 0.1 (±0.01) mm.

In another exemplary embodiment, each of the two rectangular parasitic elements have one dimension between 26 and 28 mm and another dimension between 2.5 and 3.5 mm.

In another exemplary embodiment, the rectangular parasitic elements are located at one quarter wavelength from the center on each side of the main patch segment wherein an average of quarter wavelengths of each frequency is used to calculate the location of the parasitic elements.

In another exemplary embodiment, the rectangular parasitic elements are located between 18 and 19 mm from the center of the main rectangular patch segment.

In another exemplary embodiment, each of the two rectangular parasitic elements are separated into two sections by pin diodes D1 and D2.

In another exemplary embodiment, a length of the rectangular parasitic elements is configurable by turning on or off the diodes.

In another exemplary embodiment, the parasitic elements are reconfigurable to act as a reflector or as a director according to the settings of the diodes and the Yagi-Uda principle. [see Y. Mushiake, "A theoretical analysis of the multi-element end-fire array with particular reference to the yagi-uda antenna," TRE Transactions on Antennas and Propagation, vol. 4, no. 3, pp. 441-444, July 1956 for more details of the Yagi-Uda principle]

In another exemplary embodiment, three pin diodes D3, D4 and D5 are integrated on the 3 slots of the main rectangular patch segment in order to vary the length of the main rectangular patch thereby varying the length of the resonance frequency of the segmented patch antenna.

In another exemplary embodiment, the segmented patch antenna supports at least 4 frequency bands.

In another exemplary embodiment, the segmented patch antenna is reconfigurable to 12 independent modes.

In another exemplary embodiment, the segmented patch antenna has efficiency of at least 92% while configured to transmit at 5 GHz.

In another exemplary embodiment, the segmented patch antenna operates with average gain of 3 dBi throughout the 12 independent modes.

In another exemplary embodiment, the segmented patch antenna operates with average efficiency of 77%, throughout the 12 independent modes.

In another exemplary embodiment, a back view of the segmented patch antenna includes a partial ground with one dimension between 2.5 and 3.5 mm and a second dimension between 22 and 25 mm.

In another exemplary embodiment, the back view of the segmented patch antenna further includes a coaxial feed that is placed between 10 and 12 mm from a top of the partial ground.

In another exemplary embodiment, the area of the segmented patch antenna is less than 55×55 $mm^2$.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
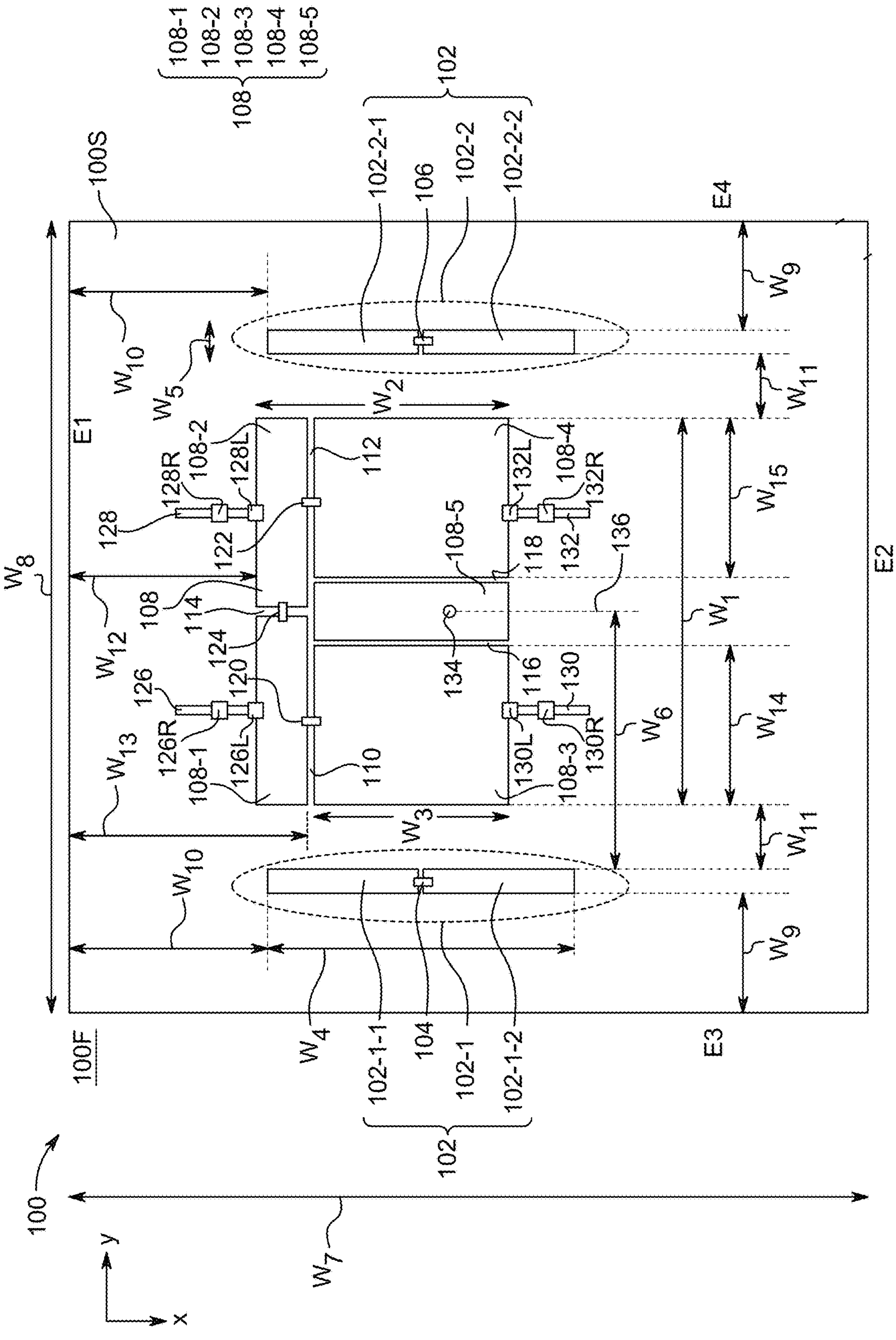
FIG. 1A illustrates a front side of a frequency and pattern reconfigurable segmented patch antenna for WiMax applications, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a frequency and pattern reconfigurable segmented patch antenna (SPA) for WiMAX Applications. The SPA has a compact and conformal antenna design, employing 5 switches that permit 12 operational modes with better bandwidth, average gain, and efficiency of 3 dBi and 77%, respectively, throughout the twelve operational modes. The SPA includes a radiating patch with three incorporated slots and two slits. Three PIN diodes are integrated on the three slots to vary a length of the radiating patch to permit frequency reconfiguration at 4.1 GHz, 4.7 GHz, 5.0 GHz, and 5.7 GHz, preferably ±0.1 GHz or ±0.5 GHz, that is, four frequency bands. The two slits are also incorporated in order to independently bias the three diodes. Two parasitic elements are configured to act as either a reflector or a director, each placed at a quarter wavelength based upon an average of quarter wavelengths of each frequency that the SPA 100 may be configured according to the Yagi-Uda principle. The SPA exhibits large number of switchable modes at four resonance frequency bands with relatively large gain and efficiency throughout all the modes, making the disclosed antenna an excellent candidate for WiMAX applications.

Figure 1B:
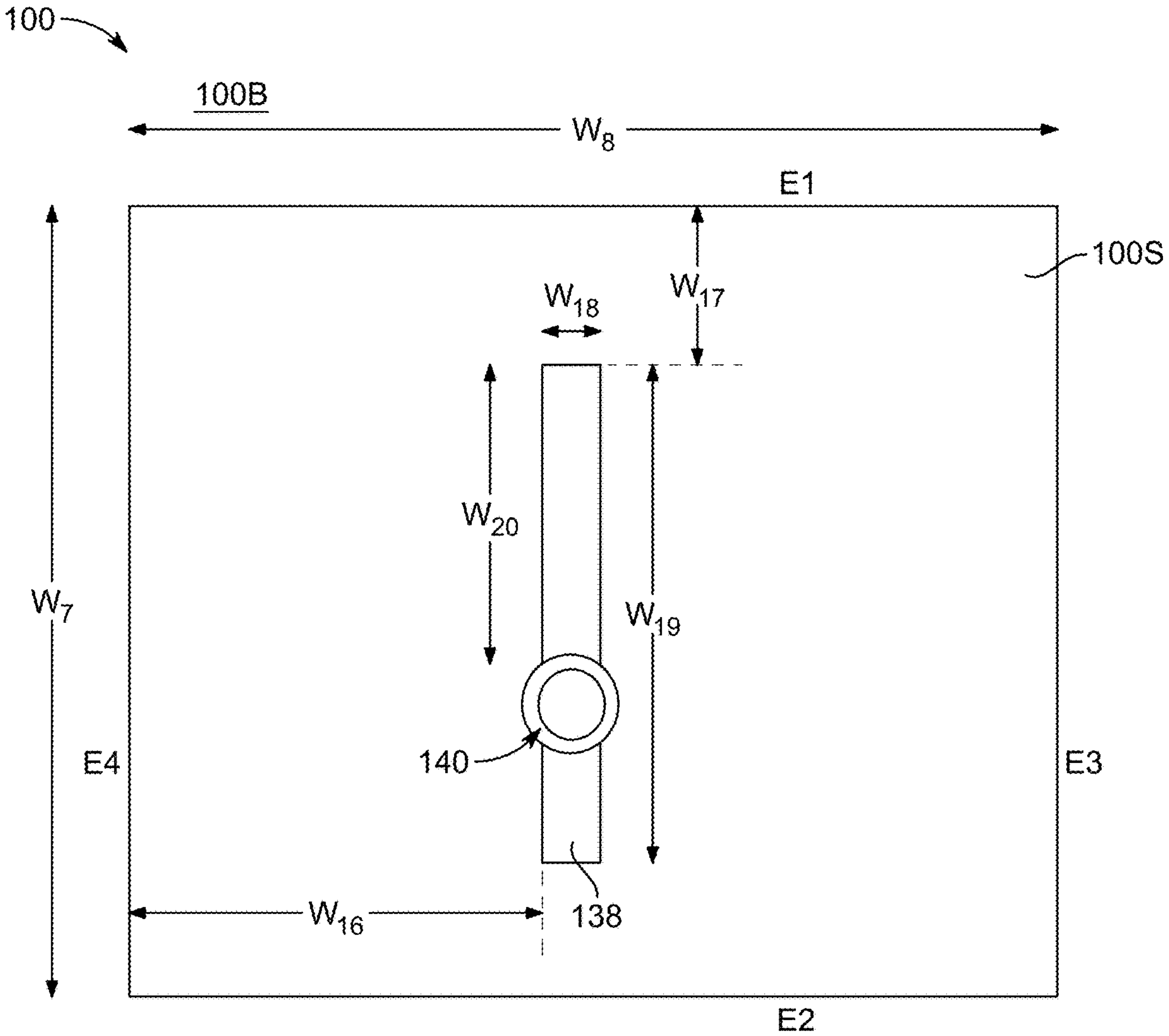
FIG. 1B illustrates a back side of a frequency and pattern reconfigurable segmented patch antenna, according to certain embodiments.

Accordingly, embodiments of the present disclosure relate to a frequency and pattern reconfigurable segmented patch antenna (SPA) 100 for WiMAX Applications. As shown in FIGS. 1A and 1B, the SPA 100 includes two rectangular parasitic elements 102, that is, a first rectangular parasitic element 102-1 and a second rectangular parasitic element 102-2. The first rectangular parasitic element 102-1 and the second rectangular parasitic element 102-2 are integrated with a first diode 104 and a second diode 106, respectively. The SPA 100 further includes a main rectangular patch segment 108. The main rectangular patch segment 108 includes three slots, that is, a first slot 110, a second slot 112 and a third slot 114. The main rectangular patch segment 108 includes two slits, that is, a first slit 116 and a second slit 118. The main rectangular patch segment 108 further includes three PIN diodes, that is, a third diode 120, a fourth diode 122, and a fifth diode 124 integrated into the first slot 110, the second slot 112 and the third slot 114, respectively. Based upon working of plurality of diodes (the first diode 104 and the second diode 106) and the parasitic elements (the first rectangular parasitic element 102-1 and the second rectangular parasitic element 102-2). The diodes are integrated into the three slots to vary the length of the entire patch in order to enable the frequency reconfiguration. This enables the SPA 100 suitable for use in multiple frequencies between 4.1 GHz and 5.7 GHz inclusive and configurable to operate in twelve independent modes. The details of the designed SPA 100 are illustrated in FIG. 1A and FIG. 1B.

FIG. 1A illustrates a front side 100F of a frequency and pattern reconfigurable segmented patch antenna (or simply referred to as an SPA 100) for WiMAX applications, according to an embodiment of the present disclosure. The front side 100F may refer to a top side or front view or top view of the SPA 100. (top side, front side, front view or top view are used interchangeably in the present disclosure). The front side 100F of the SPA 100 may include at least four edges, that is, a first edge $E_1$, a second edge $E_2$, a third edge $E_3$, and a fourth edge $E_4$. The first edge $E_1$ is preferably parallel to the second edge $E_2$, and the third edge $E_3$ is preferably parallel to the fourth edge $E_4$. Also, the third edge $E_3$ and the fourth edge $E_4$ may be perpendicular to the first edge $E_1$ and the second edge $E_2$. In an embodiment, edges $E_3$ and $E_2$ may not be perpendicular to each other. For example, the edge $E_3$ may be at an angle of 80-89 degrees to the edge $E_2$. Similarly, edges $E_1$ and $E_4$ may have angle of around 80-89 degrees therebetween. The SPA 100 also includes a back side 100B (also referred to as back view 100B) that refers to a bottom side or back view or a bottom view of the SPA 100. (back side, bottom side, back view or bottom view or used interchangeably in the present disclosure). The back side 100B of the SPA 100 is described in detail in FIG. 1B.

The front side 100F and the back side 100B are separated by a substrate 100S over which the components of the SPA 100 are integrated. In an embodiment, the substrate 100S is made up of a dielectric material. The dielectric material may be selected from a group containing an FR-4 PCB, a PTFE material, Rogers R04350 or Rogers RT5880 substrate and such substrates. In some examples, the substrate 100S is selected as Rogers RT5880 of dielectric constant value 2.2+/−0.2, preferrable+/−0.1 and loss tangent 0.0009 and height 1.572 mm. The selection of the dielectric material is not limited to the group, and any other known material may be selected to act as a base material for designing an electronic circuit of the SPA 100. Also, length and width of the substrate 100S is $W_8$ unit along Y axis and $W_7$ unit along X axis, respectively. In some examples, $W_7=W_8=50$ mm or less (±5 mm, preferably ±2 mm). Accordingly, the total volume of the SPA 100 is 50 mm (±5 mm, preferably ±2 mm)×50 mm (±5 mm, preferably ±2 mm)×1.572 (±0.1 mm, preferably ±0.05 mm) or less than or equal to 55×55×1.672 $mm^3$ in volume.

The front side 100F of the SPA 100 includes two rectangular parasitic elements 102, that is, the first rectangular parasitic element 102-1 and the second rectangular parasitic element 102-2. The rectangular parasitic element 102 refers to a conductive sheet, such as an etched metallic sheet disposed over the substrate 100S located at the front side 100F of the SPA 100. The length and the width of each of the rectangular parasitic element 102, that is, the first rectangular parasitic element 102-1 and the second rectangular parasitic element 102-2, is $W_4$ unit along X axis and $W_5$ unit along Y axis. In an example, a length of the rectangular parasitic element 102, that is, $W_4$ is 26.7 mm or can be between 26 mm and 28 mm. Also, as an example, the width of the rectangular parasitic element 102, can be, $W_5=3.2$ mm (±0.4 mm). Also, the first rectangular parasitic element 102-1 is located at $W_9$ units from the third edge $E_3$ and $W_{10}$ units from the first edge $E_1$. Similarly, the second rectangular parasitic elements 102-2 is also located at a distance of $W_9$ units from the fourth edge $E_4$ and $W_{10}$ units from the first edge $E_1$. In an example, $W_9$ is equal to 7.4 mm (±0.7 mm) and $W_{10}$ is equal to 15.65 mm (±1.5 mm).

The first rectangular parasitic element 102-1 is separated into two sections, that is, a first section 102-1-1 and a second section 102-1-2. Each section has a length equal to $W_4/2$ units along X axis. In order to create the section on each rectangular parasitic element 102, the disposed first rectangular parasitic element The pair of parasitic elements are etched out, through any known metal etching process such as a chemical or wet etching process, at a distance $W_{10}+W_4/2$ units from the first edge $E_1$, in the X axis direction. Etching out the metallic sheet divides the first rectangular parasitic elements 102-1 into two equal parts. The parts are thus, for example, referred to as the first section 102-1-1 and the second section 102-1-2, respectively. The first diode 104 is electrically connected to the first section 102-1-1 and the second section 102-1-2. For example, a first terminal (not shown) of the first diode 104 is connected (e.g., soldered) to the first section 102-1-1, and a second terminal (not shown) of the first diode 104 is soldered to the second section 102-1-2. The electrical arrangement therefore establishes an electrical connection between the first section 102-1-1 and the second section 102-1-2 through the first diode 104. The electrical connection so established is utilized to either increase or decrease the length of the first rectangular parasitic elements 102-1. Accordingly, the length of the first rectangular parasitic elements 102-1 is configurable by turning on or off the first diode 104. Based upon a bias setting of the first diode 104, that is, turning on or off the first diode 104, as well as based upon the Yagi-Uda principle, the first rectangular parasitic element 102-1 is reconfigurable to either function as a reflector or a director of the SPA 100.

The second rectangular parasitic elements 102-2 is also separated into two sections, that is, a third section 102-2-1 and a fourth section 102-2-2. Each section has a length equal to $W_4/2$ units along the X axis. Through the etching process, the second rectangular parasitic elements 102-2 is divided into two equal parts. The parts are thus referred to as the third section 102-2-1 and the fourth section 102-2-2, respectively. Also, a second diode 106 is electrically connected to the third section 102-2-1 and the fourth section 102-2-2. For example, a first terminal (not shown) of the second diode 106 is soldered to the third section 102-2-1, and a second terminal (not shown) of the second diode 106 is soldered to the second section 102-2-2. The electrical arrangement therefore establishes an electrical connection in between the third section 102-2-1 and the fourth section 102-2-2 through the second diode 106. The electrical connection so established is utilized to either decrease or increase a length of the second rectangular parasitic elements 102-2. Accordingly, the length of the second rectangular parasitic elements 102-2 is configurable by turning on or off the second diode 106. Therefore, based upon a bias setting of the second diode 106, that is, turning on or off the second diode 106, as well as based upon the Yagi-Uda principle the second rectangular parasitic element 102-1 is also reconfigurable to either function as a director or a reflector of the SPA 100.

The front side 100F of the SPA 100 includes the main rectangular patch segment 108. The main rectangular patch segment 108 refers to another conductive sheet, such as a metallic sheet disposed over the substrate 100S located at the front side 100F of the SPA 100. The length and the width of the main rectangular patch segment 108 $W_1$ unit along the Y axis and $W_2$ unit along the Y axis. In an example, the length of the main rectangular patch segment 108, that is, $W_1=26.9$ mm (±1 mm) Also, as an example, the width of the main rectangular patch segment 108, that is, is $W_2=22.1$ mm (±2 mm) Also, the main rectangular patch segment 108 is located at a distance of $W_{12}$ units from the first edge $E_1$. In an example, $W_{12}$ is equal to 17.95 (±1.8 mm).

The main rectangular patch segment 108 includes at least three slots, that is, the first slot 110, the second slot 112 and the third slot 114. In order to create the first slot 110 on the main rectangular patch segment 108, the disposed main rectangular patch segment 108 is etched out, through any known metal etching process such as a chemical or wet etching process, at a distance of $W_{13}$ unit from the first edge $E_1$, along the X axis till the distance of $W_1/2$ unit. Etching out the main rectangular patch segment 108 therefore creates the first slot 110 of length $W_1/2$ units at a distance of $W_9+W_5+W_{11}$ unit from the third edge $E_3$ along the Y-axis, and $W_{13}$ units from the first edge $E_1$ along the X-axis direction. Similarly, in order to create the second slot 112 on the main rectangular patch segment 108, the disposed main rectangular patch segment 108 is etched out at a distance of $W_{13}$ unit from the first edge $E_1$, along the X-axis till the distance of $W_1/2$ unit, opposite to the first slot 110. Etching out the main rectangular patch segment 108 therefore creates the second slot 112 of length $W_1/2$ units at a distance of $W_9+W_5+W_{11}$ unit from the fourth edge $E_4$ along the Y-axis and $W_{13}$ units from the first edge $E_1$ along the X-axis. Accordingly, the first slot 110 and the second slot 112 appear as a continuation of a slot of length $W_1$ unit at a distance of $W_{13}$ units from the first edge along the Y-axis direction. The first slot 110 and the second slot 112 have a distance of $W_1/2$ units each. In order to create the third slot 114 on the main rectangular patch segment 108, the disposed main rectangular patch segment 108 is etched out vertically in a downward direction at a distance of $W_{12}$ units from the first edge $E_1$ and at a mid-point of the main rectangular patch segment 108. Etching out the main rectangular patch segment 108 creates the third slot 114 of length $W_2$-$W_3$ units at a distance of $W_{12}$ units from the first edge $E_1$ in vertically downward direction towards the X-axis. Accordingly, the third slot 114 touches the first slot 110 and the second slot 112. The first slot 110, the second slot 112 and the third slot 114 have a width between 0.5 mm and 0.7 mm. In an embodiment, each slot has a width equal to 0.6 mm (±0.1 mm) Creating of the first slot 110 and the third slot 114 cuts the main rectangular patch segment 108 into a first part 108-1. Similarly, creation of the second slot 112 and the third slot 114 cuts the main rectangular patch segment 108 into a second part 108-2.

The main rectangular patch segment 108 further includes at least two slits, for example the first slit 116 and the second slit 118. In order to create the first slit 116 on the main rectangular patch segment 108, the disposed main rectangular patch segment 108 is etched out at a distance of $W_{13}$ unit from the first edge $_{E1}$, and the first slit 116 is located in vertical direction at a distance of $W_9+W_5+W_{11}+W_{14}$ units from the third edge $E_3$. Etching out the main rectangular patch segment 108 therefore creates the first slit 116 of length $W_3$ units at a distance of $W_9+W_5+W_{11}+W_{14}$ units from the third edge $E_3$ and $W_{13}$ units from the first edge $E_1$. Similarly, in order to create the second slit 118 on the main rectangular patch segment 108, the disposed main rectangular patch segment 108 is etched out at a distance of $W_{13}$ unit from the first edge $E_1$, and the second slit 118 is located in a vertical direction at a distance of $W_9+W_5+W_{11}+W_{15}$ units from the fourth edge $E_4$. Etching out the main rectangular patch segment 108 creates the second slit 118 of length $W_3$ units at a distance of $W_9+W_5+W_{11}+W_{15}$ units from the fourth edge $E_4$ and $W_{13}$ units from the first edge $E_1$. Also, the first slit 116 touches and is perpendicular to the first slot 110 and the second slit 118 touches and is perpendicular to the second slot 112. In an embodiment, the first slit 116 and the second slit 118 has a thickness no larger than 0.1 mm (±0.01 mm). Therefore, there is almost no effect of the slits on the resonance frequency of the SPA 100, since 0.1 mm (±0.01 mm) is a smallest possible value required for fabrication. Creating the first slit 116 with the first slot 110 divides the main rectangular patch segment 108 into a third part 108-3. Similarly, creating of the second slit 118 with the second slot 112 cuts the main rectangular patch segment 108 into a fourth part 108-4. Also, an area of the main rectangular patch segment 108 illustrated in between the first slit 116 and the second slit 118 represents a fifth part 108-5 of the main rectangular patch segment 108. Accordingly, the combination of three slots and two slits over the main rectangular patch segment 108 cuts the main rectangular patch segment 108 into five parts.

The main rectangular patch segment 108 includes at least three diodes, that is, the third diode 120, the fourth diode 122 and the fifth diode 124. The third diode 120 is electrically connected to the first part 108-1 and the third part 108-3. For example, a first terminal (not shown) of the third diode 120 is soldered to the first part 108-1 and a second terminal (not shown) of the third diode 120 is soldered to the third part 108-3. Similarly, the fourth diode 122 is electrically connected to the second part 108-2 and the fourth part 108-4. For example, a first terminal (not shown) of the fourth diode 122 is soldered to the second part 108-2 and a second terminal (not shown) of the fourth diode 122 is soldered to the fourth part 108-4. Also, the fifth diode 124 is electrically connected in between the first part 108-1 and the second part 108-2. For example, a first terminal (not shown) of the fifth diode 124 is soldered to the first part 108-1 and a second terminal (not shown) of the fifth diode 124 is soldered to the second part 108-2. Accordingly, three diode arrangements establish an electrical connection in between the first part 108-1, the second part 108-2, the third part 108-3 and the fourth part 108-4. The electrical connection established is utilized to either increase or decrease or vary a length of main rectangular patch segment 108. Accordingly, the main rectangular patch segment 108 is viewed as a segmented patch as a result of the first slot 110, the second slot 112 and the third slot 114. Also, due to the presence of two slits: the first slit 116 and the second slit 118, the third diode 120 and the fourth diode 122 can be biased independently and also avoid any physical connection. Accordingly, the length of the main rectangular patch segment 108 is configurable by turning on or off the three diodes. As such, the three diodes integrated on the three slots of the main rectangular patch segment 108 are configured to vary the length of the main rectangular patch segment 108. Varying the length of the main rectangular patch segment 108 therefore varies the length and consequently the resonance frequency of the SPA 100. Therefore, based on bias settings of the each of the three diodes, that is, turning on or off, the length of the main rectangular patch segment 108 is also reconfigurable.

The main rectangular patch segment 108 further includes a feed point 134 over the fifth part 108-5 of the main rectangular patch segment 108. The feed point 134 is located at a mid-location of the main rectangular patch segment 108, that is, at a distance of $W_9+W_5+W_{11}+W_1/2$ from the third edge $E_3$. In another example, an imaginary axis 136 may be considered that bisects the main rectangular patch segment 108 into two equal parts. Each part, thus formed, has length of $W_1/2$ units. The feed point 134 may be located at the bisecting location, that is, over the imaginary axis 136. In some examples, the position of the feed point 134 may be anywhere over the imaginary axis 136 within the fifth part 108-5. One terminal of the feed point 134 may be soldered over the fifth part 108-5 of the main rectangular patch segment 108. Another terminal of the feed point 134 is electrically connected to the back side 100B of the SPA 100 that electrically couples a partial ground (not shown here) located at the back side 100B of the SPA 100. For example, a hole (not shown) may be created over the fifth part 108-5 as well as over the substrate 100S immediately below the hole of the fifth part 108-5. The hole (not shown) thus acts as a via (not shown) that opens at the back side 100B of the SPA 100. At the back side 100B, the via (not shown) couples to the partial ground 138. Accordingly, through soldering, an electrical connection may be established between the fifth part 108-5 at the front side 100F and the partial ground 138 at the back side 100B through the via (not shown) in the substrate 100S. Details of the partial ground is discussed in the FIG. 1B.

In an embodiment, the rectangular parasitic elements 102 are located at a distance of $W_6$ units from the imaginary axis 136 on either side of the main rectangular patch segment 108. For example, the first rectangular parasitic element 102-1 is located at a distance of $W_6$ units towards the third edge $E_3$ and the second rectangular parasitic element 102-2 is symmetrically located at a distance of $W_6$ units towards the fourth edge $E_3$, respectively, from the imaginary axis 136. The location of the rectangular parasitic elements 102 with respect to the main rectangular patch segment 108 may depend upon an average of quarter wavelengths of each frequency that the SPA 100 is designed for. Based upon the average value of the resonating frequency, a quarter wavelength value may be calculated based on the relationship between the frequency and wavelength. Accordingly, the location of the rectangular parasitic element 102 is computed based upon the average of quarter wavelength of each frequency. In an embodiment, the length $W_6$ is equal to 18.4 mm (±1.0 mm or preferably ±0.5 mm). The distance $W_6$ is almost equal to one quarter wavelength from the imaginary axis 136 on each side of the main rectangular patch segment 108. In another embodiment, the distance between the rectangular parasitic elements 102 and the main rectangular patch segment 108 is equal to $W_n$ units.

The front side 100F of the SPA 100 includes at least four biasing lines. The biasing line refers to a metallic strip disposed over the substrate 100S for biasing the three diodes over the main rectangular patch segment 108. For example, a first biasing line 126 including a first limiting resistor 126R and a first choke inductor 126L is electrically soldered to the first part 108-1 of the main rectangular patch segment 108. Similarly, a second biasing line 128 including a second limiting resistor 128R and a second choke inductor 128L is electrically soldered to the second part 108-2 of the main rectangular patch segment 108. Also, a third biasing line 130 including a third limiting resistor 130R and a third choke inductor 130L is electrically soldered to the third part 108-3 of the main rectangular patch segment 108. In the same way, a fourth biasing line 132 including a fourth limiting resistor 132R and a fourth choke inductor 132L is electrically soldered to the fourth part 108-4 of the main rectangular patch segment 108. In an embodiment, a length of each of biasing line is in between 7 and 8 mm and width is in between 1 and 3 mm. For example, each biasing line may have length of 7.6 mm and width of 2 mm. Adding the biasing lines ensure the radiation characteristics of the SPA 100 are not distorted. Also, as an example, value of each limiting resistor and each choke inductor are selected as 500 MΩ and 68 nH, respectively. The limiting resistor in each biasing line limits the biasing current through the diodes in the main rectangular patch segment 108, since the diodes could be biased at no more than 0.7V. Also, the choke inductors in each biasing line isolates the RF signals from the DC supply such as a battery.

FIG. 1B illustrates a back side 100B of a frequency and pattern reconfigurable segmented patch antenna 100 for WiMAX applications, according to an embodiment of the present disclosure. The back side 100B may refer to a back view or bottom view of the SPA 100. The back side 100B includes a partial ground 138. The partial ground 138 also refers to a metallic strip disposed over the substrate 100S at the back side 100B of the SPA 100. The partial ground 138 is located at a distance of $W_{16}$ units from the fourth edge $E_4$ and $W_{17}$ units from the first edge $E_1$. The partial ground 138 includes one dimension of length equal to $W_{18}$ units and a second dimension of length equal to $W_{19}$ units. The one dimension refers to the width of the partial ground 138 and the second dimension refers to the length of the partial ground 138. In an embodiment, the width of the one dimension, that is, $W_{18}$ of the partial ground 138 is 3 mm (±0.5 mm). For example, the length $W_{18}$=3.18 mm. The length of the second dimension of the partial ground 138 is 23.5 mm (±1.5 mm). For example, $W_{19}$=23.74 mm. Also, a coaxial feed 140 is placed over the partial ground 138. In an embodiment, the coaxial feed 140 is placed at a distance of $W_{20}$ units from top of the partial ground 138 or at a distance of $W_{20}$+$W_{17}$ units from the first edge $E_1$. The distance $W_{20}$ may equal 11 mm (±1.0 mm) such as 11.11 mm or any value within 10 and 12 mm. The partial ground 138 has a minimal effect over the tilting angles of the SPA 100. The feed point 134 (shown in FIG. 1A) is electrically connected to the coaxial feed 140. For example, through soldering, the coaxial feed 140 over the partial ground 138 electrically and mechanical connects the feed point 134 over the fifth part 108-5 of the main rectangular patch segment 108, through the via (not shown) in the substrate 100S.

Figure 1C:
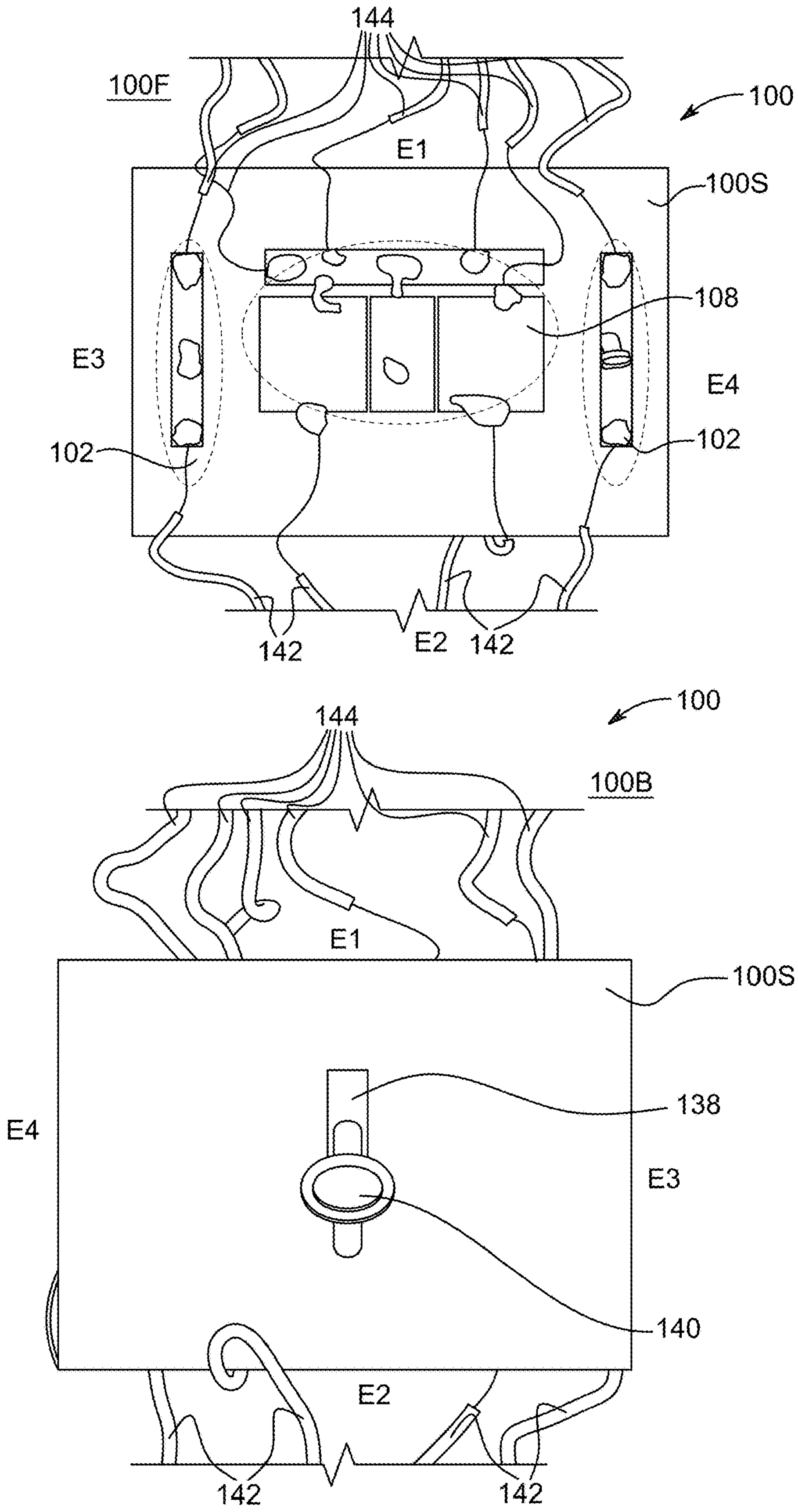
FIG. 1C illustrates a prototype model of the frequency and pattern reconfigurable segmented patch antenna including a front side and a back side, according to certain embodiments.

FIG. 1C illustrates a prototype model of the frequency and pattern reconfigurable segmented patch antenna 100, including a front side 100F (left of FIG. 1C) and a back side 100B (right side of FIG. 1C), according to aspects of the present disclosure. The SPA 100 and all four edges, that is, the first edge $E_1$, the second edge $E_2$, the third edge $E_3$, and the fourth edge $E_4$, are illustrated in each diagram. A view of back side 100B is obtained when the front side 100F is rotated 180° with respect to the fourth edge $E_4$. Additionally, a view of the back side 100B is also obtained when the front side 100F is rotated 180° with respect to the third edge $E_3$. The diagram shows the location of the rectangular parasitic elements 102 and main rectangular patch segment 108 over the substrate 100S. The diagram also shows a plurality of electrical wires 142 and 144 of the rectangular parasitic elements 102 and the main rectangular patch segment 108 for biasing the diodes of the SPA 100. The back side 100B illustrates the location of the partial ground 138 and the coaxial feed 140 over the partial ground 138 above the substrate 100S.

With reference to FIG. 1A, FIG. 1B and FIG. 1C, the operation of the frequency and pattern reconfigurable segmented patch antenna 100 is described. In order to bias one or more diodes, that is, the first diode 104, the second diode 106, the third diode 120, the fourth diode 122 and the fifth diode 124 of the SPA 100, an electronic device (not shown), for example, may be electrically coupled to the SPA 100. For example, the electronic device (not shown) may have an electrical connection with the wires 142 and 144 of the biasing lines 126, 128, 130 and 132 of the SPA 100. Connecting the electronic device (not shown) with the SPA 100 aids in automatic switching of the plurality of diodes On or Off connected with the biasing lines, based upon the requirement of the frequency reconfiguration as well as radiation pattern reconfiguration in the desired direction. In an embodiment, switching of the diodes may be done manually. For example, an electronic circuit (not shown) comprising a plurality of logic gates may be electrically coupled with the wires 142 and 144 of the SPA 100. Based upon the requirement of the frequency reconfiguration as well as radiation pattern reconfiguration in the desired direction, the logic gates may be manually operated to either turn On or Off all or some of the diodes of the SPA 100. Also, the signal that is to be radiated through the SPA 100 in the space is applied at the coaxial feed 140.

The parasitic elements 102 are configured to act as a reflector or as a director according to bias settings of the diodes and the Yagi-Uda principle. According to the Yagi-Uda principle, an element, when placed at quarter wavelength from the center of the main radiating element, act as a reflector or director depending on the length of the element. Based on the Yagi-Uda principle, the reflector is configured to reflect all the radiated beams of the radiating element towards the director whenever the length of the reflector is more compared to the director, whereas the director is configured to concentrate the radiation beam. In the design of SPA 100, the main rectangular patch segment 108 acts as the main radiating element or a driving element, the first rectangular parasitic element 102-1 act as a first element and the second rectangular parasitic element 102-2 acts as a second element. The first element and the second element are configured to act either as a director or a reflector or vice versa. Both elements are placed at a quarter wavelength $W_6$ units from the main rectangular patch segment 108. When the first diode 104 is turned 'On' and the second diode 106 is turned 'Off', the first section 102-1-1 and the second section 102-1-2 function as an element of length $W_4$ units. The first rectangular parasitic element 102-1 thus acts as a reflector element, whereas the second rectangular parasitic element 102-2 acts as the director. On the other hand, when the first diode 104 is turned 'Off' and the second diode is turned 'On', the first section 102-1-1 and the second section 102-1-2 function as an element of length $W_4/2$ units or less, whereas the third section 102-2-1 and the fourth section 102-2-2 acts an element of length $W_4$ units. The first rectangular parasitic element 102-1 thus acts as a director element, whereas the second rectangular parasitic element 102-1 acts as a reflector element. The pattern reconfiguration in any direction is thus achieved since the surface current distribution of the SPA 100 is altered based upon the setting of all five diodes.

Plurality of the operating modes of the SPA 100 is now described in detail.

First mode settings: The first diode 104 is set to '1', the second diode 106 is set to '0', the third diode 120 is set to '1', the fourth diode 122 is set to '1', and the fifth diode 124 is set to '1'. Based on the settings, the first rectangular parasitic element 102-1 acts as a reflector and the second rectangular parasitic element 102-2 acts as a director as the length of the first rectangular parasitic element 102-1 is more compared to the second rectangular parasitic element 102-2. The SPA 100 resonates at 4.1 GHz. Also, the SPA 100 radiates at 143 degree of radiation angle.

Second mode settings: The first diode 104 is set to '0', the second diode 106 is set to '1', the third diode 120 is set to '1', the fourth diode 122 is set to '1', and the fifth diode 124 is set to '1'. Based on the settings, the first rectangular parasitic element 102-1 acts as a director and the second rectangular parasitic element 102-2 acts as a reflector as the length of the second rectangular parasitic element 102-2 is increased compared to the first rectangular parasitic element 102-1. The SPA 100 resonates at 4.1 GHz. According to the settings, the SPA 100 radiates at −143 degrees of radiation angle.

Third mode settings: The first diode 104 is set to '1', the second diode 106 is set to '1', the third diode 120 is set to '1', the fourth diode 122 is set to '1', and the fifth diode 124 is set to '1'. Based on the settings the first rectangular parasitic element 102-1 as well as the second rectangular parasitic element 102-2 have the same element length and none of them acts either as a director or a reflector. The SPA 100 resonates at 4.1 GHz. Based on settings, the SPA 100 radiates at 180 degrees of radiation angle.

Fourth mode settings: The first diode 104 is set to '1', the second diode 106 is set to '1', the third diode 120 is set to '1', the fourth diode 122 is set to '0', and the fifth diode 124 is set to '1'. As a result of the setting, the length of the radiating element, that is, the main rectangular patch segment 108 of the SPA 100 becomes shorter since one of the diode, (the fourth diode in this case) is set as off. Accordingly, the resonance frequency of the SPA 100 increases to 4.7 GHz. Also, the first rectangular parasitic element 102-1 as well as the second rectangular parasitic element 102-2 have the same element length and none of them acts either as a director or a reflector. Further, the SPA 100 radiates at a radiation angle of 38 degree.

Fifth mode settings: The first diode 104 is set to '1', the second diode 106 is set to '1', the third diode 120 is set to '0', the fourth diode 122 is set to '1', and the fifth diode 124 is set to '1'. Based on the settings, the length of the radiating element, that is, the main rectangular patch segment 108 of the SPA 100 becomes shorter since one of the diode, (the third diode in this case) is set as off. The SPA 100 resonates at the resonance frequency of 4.7 GHz. Also, the first rectangular parasitic element 102-1 as well as the second rectangular parasitic element 102-2 have the same element length and none of them acts either as a director or a reflector. Further, the SPA 100 radiates at a radiation angle of −38 degrees.

Sixth mode settings: The first diode 104 is set to '1', the second diode 106 is set to '0', the third diode 120 is set to '1', the fourth diode 122 is set to '0', and the fifth diode 124 is set to '1'. According to the settings, the length of the radiating element, that is, the main rectangular patch segment 108 of the SPA 100 becomes shorter since one of the diode, (the third diode in this case) is set as off. Also, the second rectangular parasitic element 102-2 acts as a reflector and the first rectangular parasitic element 102-1 acts as a director as the length of the second rectangular parasitic element 102-2 is increased compared to the first rectangular parasitic element 102-1. Accordingly, based upon the setting of all fives diodes, the SPA 100 resonates at the resonance frequency of 4.7 GHz with 63 degree of radiation angle.

Seventh mode settings: The first diode 104 is set to '0', the second diode 106 is set to '1', the third diode 120 is set to '0', the fourth diode 122 is set to '1', and the fifth diode 124 is set to '1'. According to the settings, the length of the radiating element, that is, the main rectangular patch segment 108 of the SPA 100 becomes shorter since one of the diode, (the fourth diode in this case) is set as off. Also, the first rectangular parasitic element 102-1 acts as a reflector and the second rectangular parasitic element 102-2 acts as a director as the length of the first rectangular parasitic element 102-1 is increased compared to the second rectangular parasitic element 102-2. Accordingly, based upon the setting of all fives diodes, the SPA 100 resonates at the resonance frequency of 4.7 GHz with −63 degree of radiation angle.

Eighth mode settings: The first diode 104 is set to '1', the second diode 106 is set to '1', the third diode 120 is set to '0', the fourth diode 122 is set to '0', and the fifth diode 124 is set to '0'. According to the settings, the length of the radiating element, that is, the main rectangular patch segment 108 of the SPA 100 becomes even more shorter since two of the diode, (the third diode and the fourth diode in this case) is set as off. Also, the first rectangular parasitic element 102-1 as well as the second rectangular parasitic element 102-2 have the same element length and none of them acts either as a director or a reflector. Accordingly, based upon the setting of all fives diodes, the SPA 100 now resonates at the resonance frequency of 5 GHz with 0 degree of radiation angle.

Ninth mode settings: The first diode 104 is set to '1', the second diode 106 is set to '0', the third diode 120 is set to '0', the fourth diode 122 is set to '0', and the fifth diode 124 is set to '0'. According to the settings, the length of the radiating element, that is, the main rectangular patch segment 108 of the SPA 100 is as same as in the case of eighth mode. Also, the first rectangular parasitic element 102-1 acts as a reflector and the second rectangular parasitic element 102-2 acts as a director as the length of the first rectangular parasitic element 102-1 is increased compared to the second rectangular parasitic element 102-2. Accordingly, based upon the setting of all fives diodes, the SPA 100 resonates at the resonance frequency of 5 GHz with 50 degree of radiation angle.

Tenth mode settings: The first diode 104 is set to '0', the second diode 106 is set to '1', the third diode 120 is set to '0', the fourth diode 122 is set to '0', and the fifth diode 124 is set to '0'. According to the settings, the length of the radiating element, that is, the main rectangular patch segment 108 of the SPA 100 is as same as in the case of eighth mode or 9. Also, the first rectangular parasitic element 102-1 as well as the second rectangular parasitic element 102-2 have the same element length and none of them acts either as a director or a reflector. Accordingly, based upon the setting of all fives diodes, the SPA 100 resonates at the resonance frequency of 5 GHz with −50 degree angle of radiation.

Eleventh mode settings: The first diode 104 is set to '0', the second diode 106 is set to '0', the third diode 120 is set to '1', the fourth diode 122 is set to '0', and the fifth diode 124 is set to '1'. According to the settings, the length of the radiating element, that is, the main rectangular patch segment 108 of the SPA 100 is even shorter compared to previous cases. Also, the first rectangular parasitic element 102-1 as well as the second rectangular parasitic element 102-2 have the same element length and none of them acts either as a director or a reflector. Accordingly, based upon the setting of all fives diodes, the SPA 100 now resonates at the resonance frequency of 5.7 GHz with 90 degree angle of radiation.

Twelfth mode settings: The first diode 104 is set to '0', the second diode 106 is set to '0', the third diode 120 is set to '0', the fourth diode 122 is set to '1', and the fifth diode 124 is set to '1'. According to the settings, the length of the radiating element, that is, the main rectangular patch segment 108 of the SPA 100 is same as the previous cases. Also, the first rectangular parasitic element 102-1 as well as the second rectangular parasitic element 102-2 have the same element length and none of them acts either as a director or a reflector. Accordingly, based upon the setting of all fives diodes, the SPA 100 resonates at the resonance frequency of 5.7 GHz with −90 degree angle of radiation.

Based upon the setting of all five diodes and the arrangement of the patch and the parasitic element, multiple frequencies between 4.1 GHz and 5.7 GHz, that is, 4.7 GHz and 5 GHz are radiated through the SPA 100. Accordingly, the SPA 100 radiates over at least 4 different resonance frequency bands, that is, 4.1 GHz, 4.7 GHz, 5 GHz, and 5.7 GHz with twelve different independent operating modes to reconfigure the direction of the radiation beam pattern through the SPA 100.

Figure 2A:
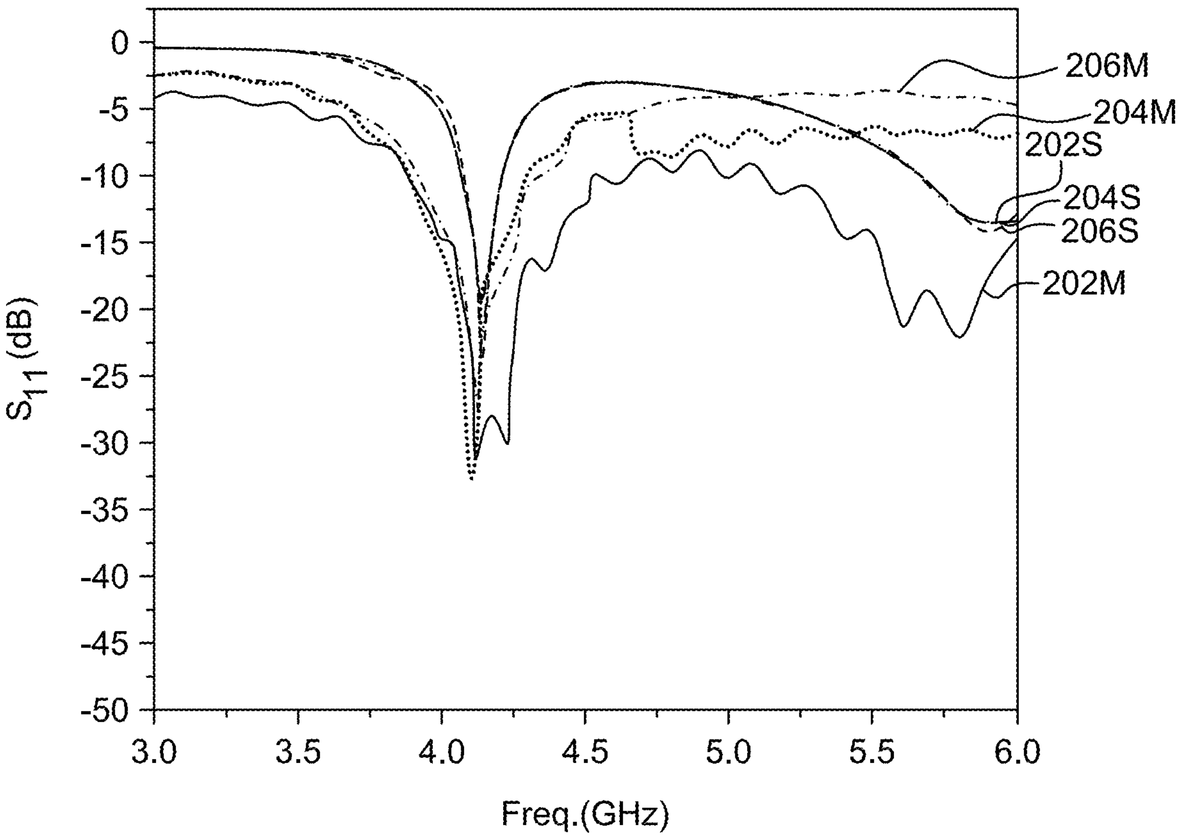
FIG. 2A illustrates plurality of curves for simulated as well as measured reflection coefficients for a first, second and a third independent operational modes of the frequency and pattern reconfigurable segmented patch antenna, according to certain embodiments.

FIG. 2A illustrates a plurality of curves for a simulated reflection coefficient $S_{11}$ as well as measured reflection coefficients $S_{11}$ for the first three independent operational modes of the SPA 100, according to an embodiment of the present disclosure. The first three independent mode refers to a first mode, a second mode and a third mode. $S_{11}$ (in dB) denotes the amount of input power reflected from the SPA 100 when a signal is applied at the input port, that is, at the feed point 134. The reflection coefficient is also known as a return loss of the SPA 100. In an example, if $S_{11}$=0 dB then all the power is reflected from the SPA 100, and nothing is radiated. The SPA 100 is biased through the first biasing line 126, the second biasing line 128, the third biasing line 130 and the fourth biasing line 132 for biasing the main rectangular patch segment 108, along with biasing the rectangular parasitic element 102. The signal is applied at the feed point 134. Curves 202S and 202M accordingly illustrate a simulated reflection coefficients Sun and a measured reflection coefficients $S_{11}$ for the first mode, respectively. Curves 204S and 204M illustrate a simulated reflection coefficients $S_{11}$ and a measured reflection coefficients $S_{11}$ for the second mode, respectively. Curves 206S and 206M illustrate a simulated reflection coefficients $S_{11}$ and a measured reflection coefficients $S_{11}$ for the third mode, respectively. Based on the simulated reflection coefficients and the measured reflection coefficients using the plurality of curves, the SPA 100 appears to resonate at the resonating frequency approximately equal to 4.1 GHz.

Figure 2B:
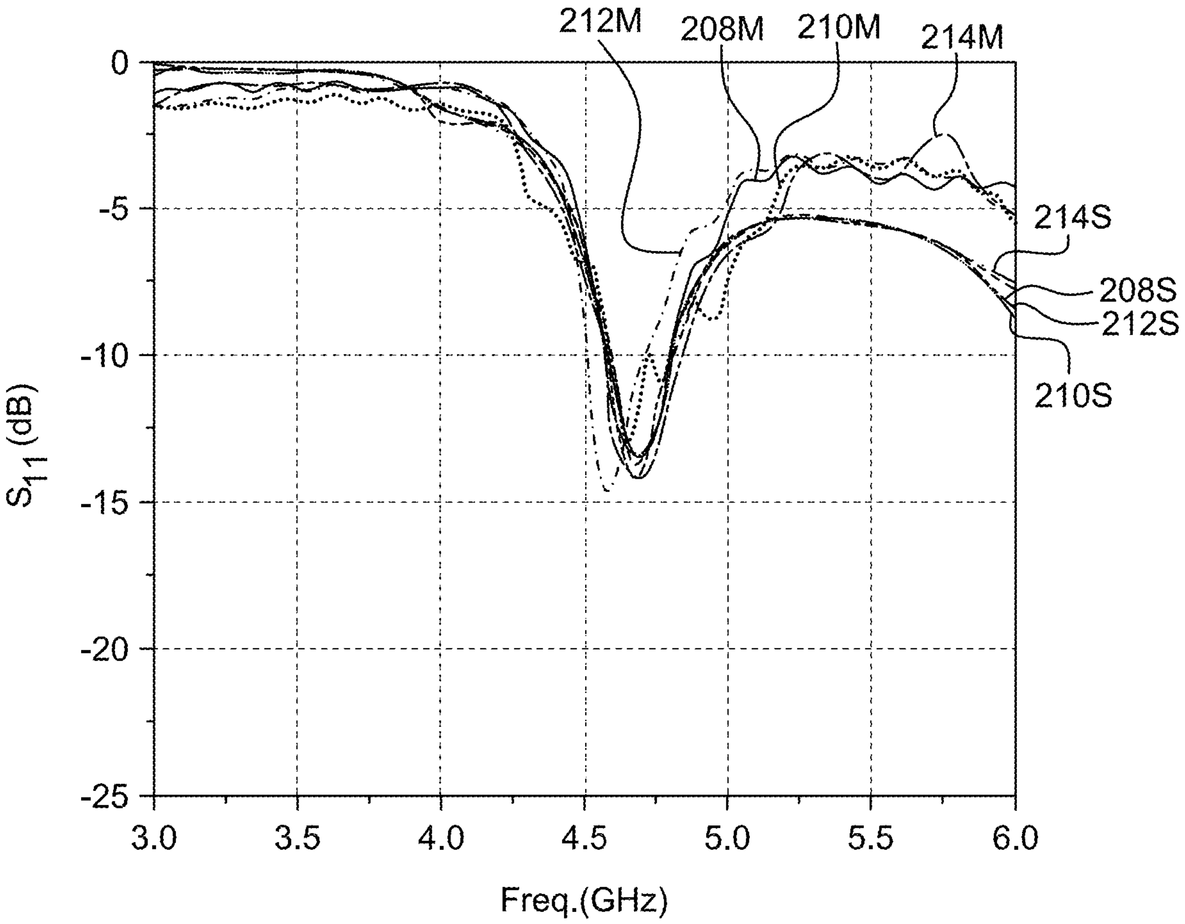
FIG. 2B illustrates plurality of curves for a simulated as well as measured reflection coefficients for a fourth, fifth, sixth and a seventh independent operational modes of the frequency and pattern reconfigurable segmented patch antenna, according to certain embodiments.

FIG. 2B illustrates a plurality of curves for a simulated reflection coefficient $S_{11}$ as well as measured reflection coefficients $S_{11}$ for the next four independent operational modes of the SPA 100, according to an embodiment of the present disclosure. The next four independent mode refers to a fourth mode, a fifth mode, a sixth mode and a seventh mode. Curves 208S and 208M accordingly illustrate simulated reflection coefficients $S_{11}$ and measured reflection coefficients $S_{11}$ for the fourth mode, respectively. Curves 210S and 210M shows simulated reflection coefficients Sn and measured reflection coefficients Sn for the fifth mode, respectively. Curves 212S and 212M illustrate a simulated reflection coefficients $S_{11}$ and a measured reflection coefficients $S_{11}$ for the sixth mode, respectively. Curves 214S and 214M illustrate a simulated reflection coefficients $S_{11}$ and measured reflection coefficients Sun for the seventh mode, respectively. Based on the simulated reflection coefficients and the measured reflection coefficients using the plurality of curves, the SPA 100 appears to resonate at the resonating frequency approximately equal to 4.7 GHz.

Figure 2C:
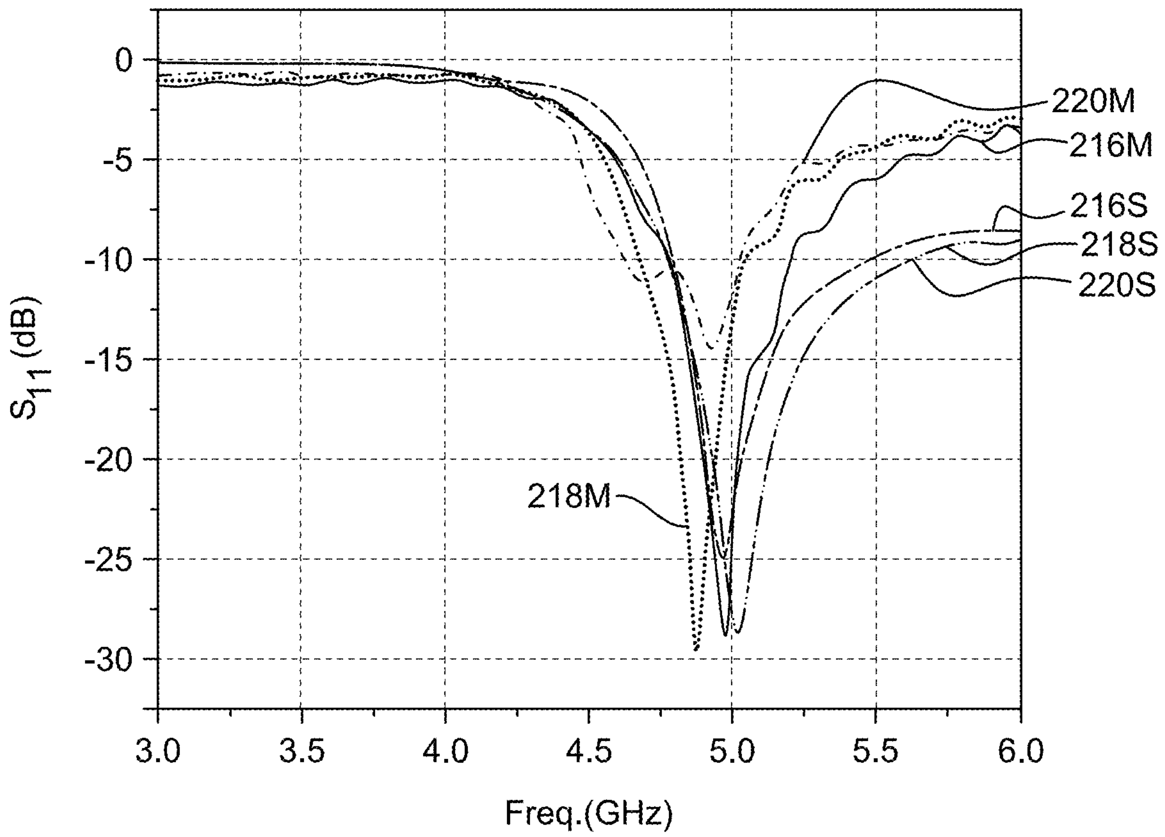
FIG. 2C illustrates plurality of curves for simulated as well as measured reflection coefficients for an eighth, ninth and a tenth independent operational modes of the frequency and pattern reconfigurable segmented patch antenna, according to certain embodiments.

FIG. 2C illustrates a plurality of curves for simulated reflection coefficient $S_{11}$ as well as measured reflection coefficients Sun for the next three independent operational modes of the SPA 100, according to an embodiment of the present disclosure. The next three independent mode refers to an eighth mode, a ninth mode and a tenth mode. Curves 216S and 216M accordingly illustrate simulated reflection coefficients $S_{11}$ and measured reflection coefficients $S_{11}$ for the eight mode, respectively. Curves 218S and 218M illustrate simulated reflection coefficients Sun and a measured reflection coefficients $S_{11}$ for the ninth mode, respectively. Curves 220S and 220M illustrate simulated reflection coefficients $S_{11}$ and measured reflection coefficients $S_{11}$ for the tenth mode, respectively. Based upon the simulated reflection coefficients and the measured reflection coefficients using the plurality of curves, the SPA 100 appears to resonate at the resonating frequency approximately equal to 5 GHz.

Figure 2D:
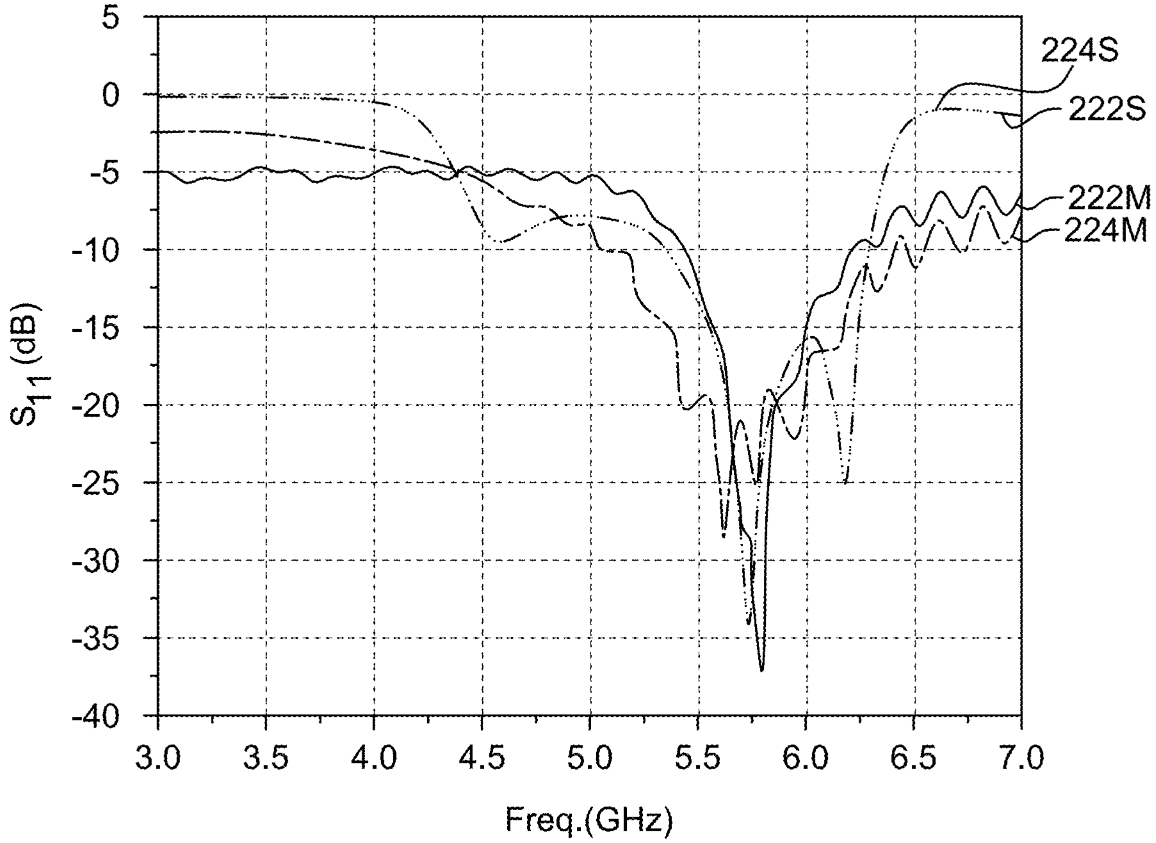
FIG. 2D illustrates plurality of curves for a simulated as well as measured reflection coefficients for an eleventh and twelfth independent operational modes of the frequency and pattern reconfigurable segmented patch antenna, according to certain embodiments.
Figure 3A:
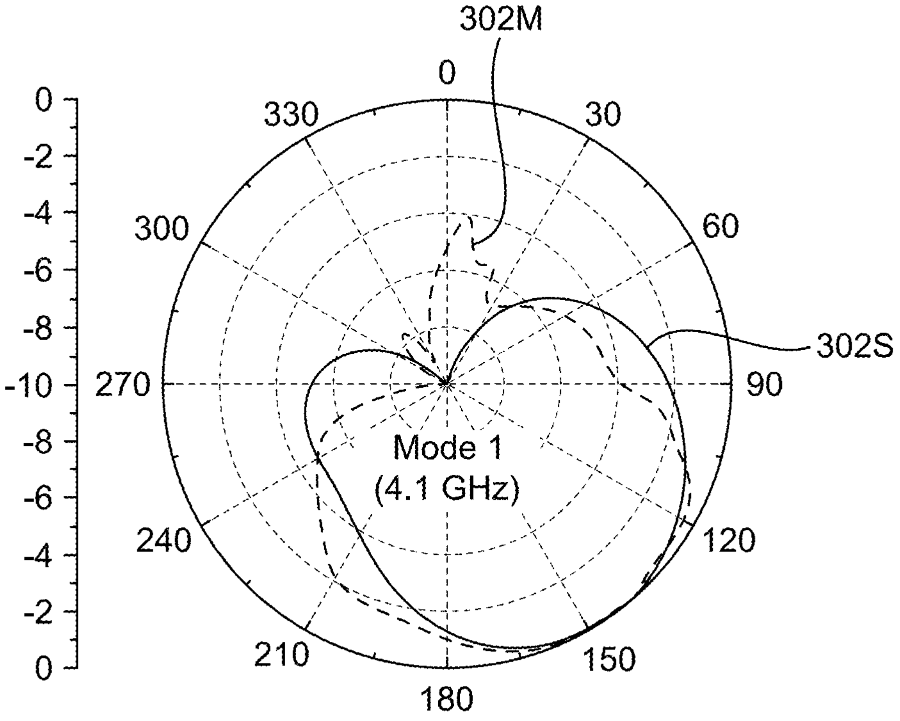
FIG. 3A is a graph illustrating simulated radiation pattern and a measured radiation pattern at a first mode, according to certain embodiments.
Figure 3B:
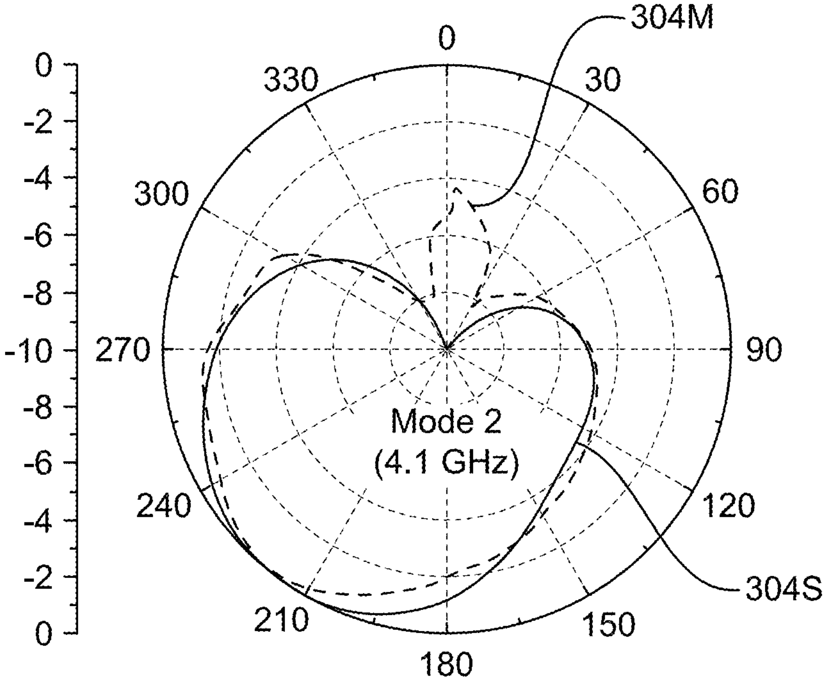
FIG. 3B is a graph illustrating simulated radiation pattern and a measured radiation pattern at a second mode, according to certain embodiments.
Figure 3C:
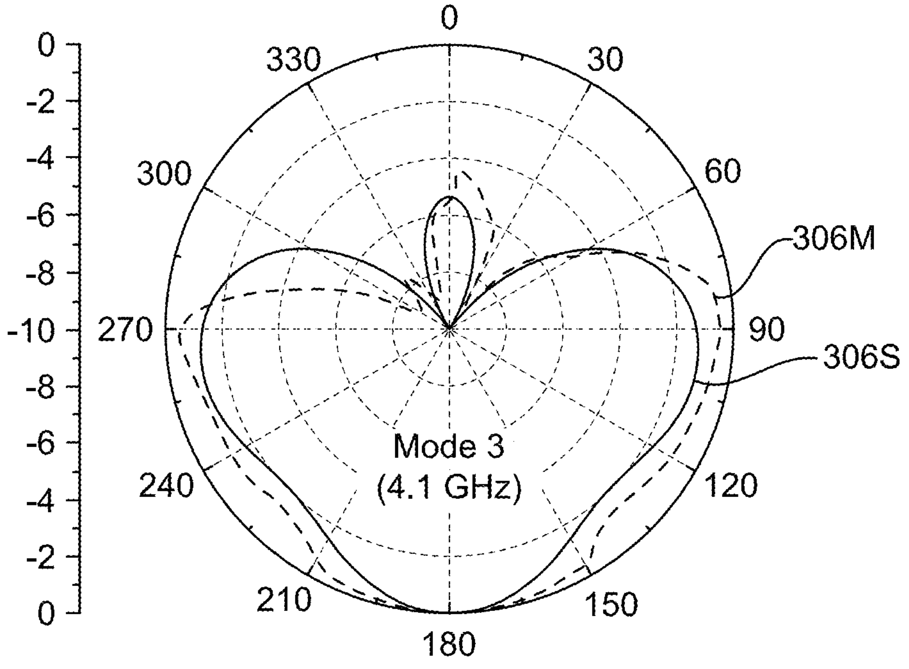
FIG. 3C is a graph illustrating simulated radiation pattern and a measured radiation pattern at a third mode, according to certain embodiments.
Figure 3D:
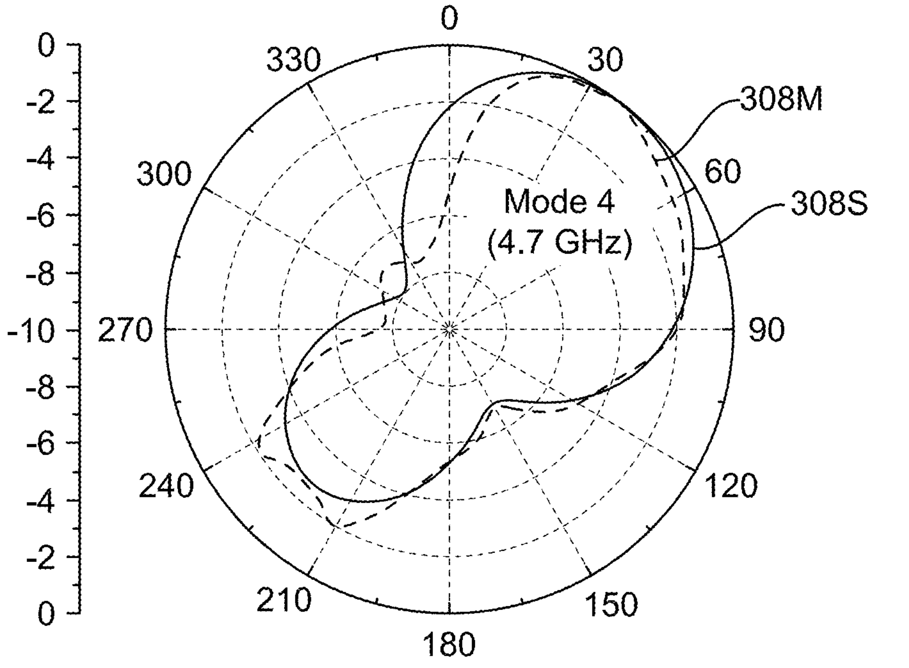
FIG. 3D is a graph illustrating simulated radiation pattern and a measured radiation pattern at a fourth mode, according to certain embodiments.
Figure 3E:
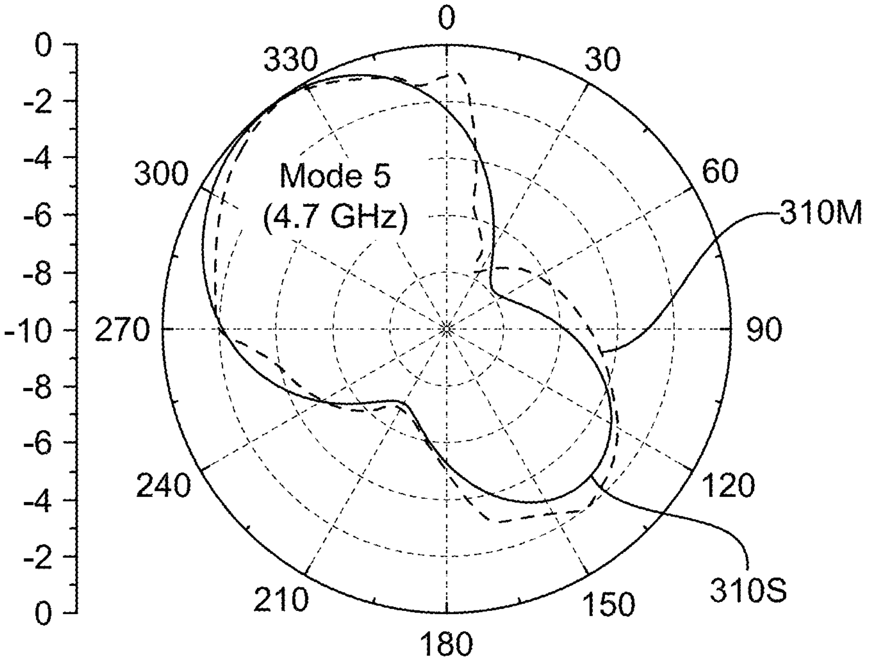
FIG. 3E is a graph illustrating simulated radiation pattern and a measured radiation pattern at a fifth mode, according to certain embodiments.
Figure 3F:
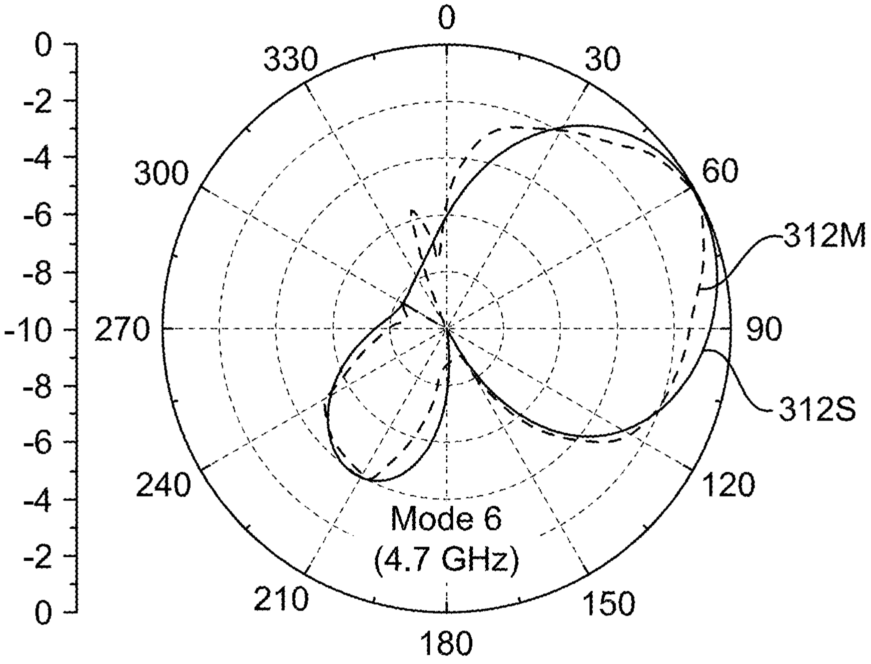
FIG. 3F is a graph illustrating simulated radiation pattern and a measured radiation pattern at a sixth mode, according to certain embodiments.
Figure 3G:
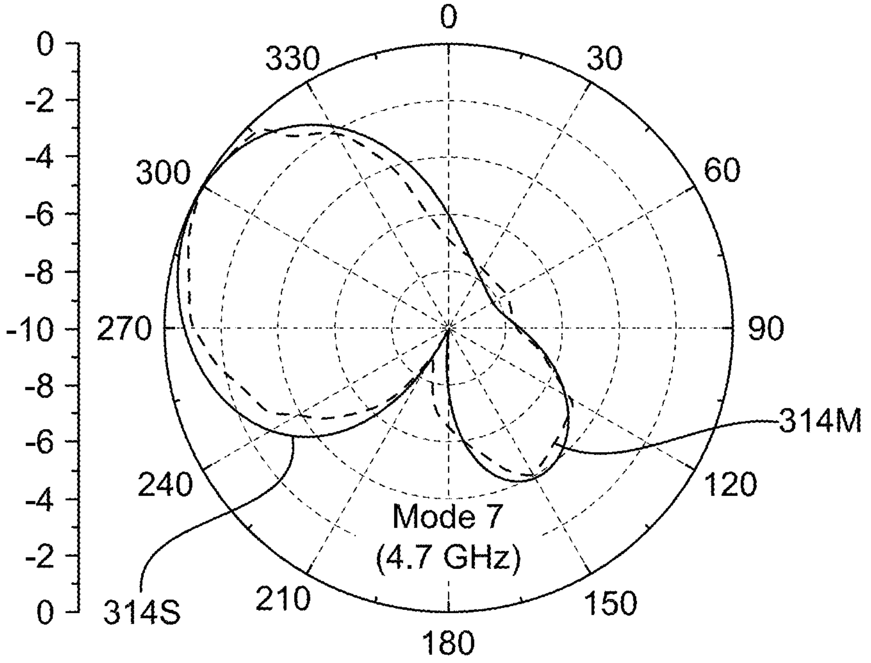
FIG. 3G is a graph illustrating simulated radiation pattern and a measured radiation pattern at a seventh mode, according to certain embodiments.
Figure 3H:
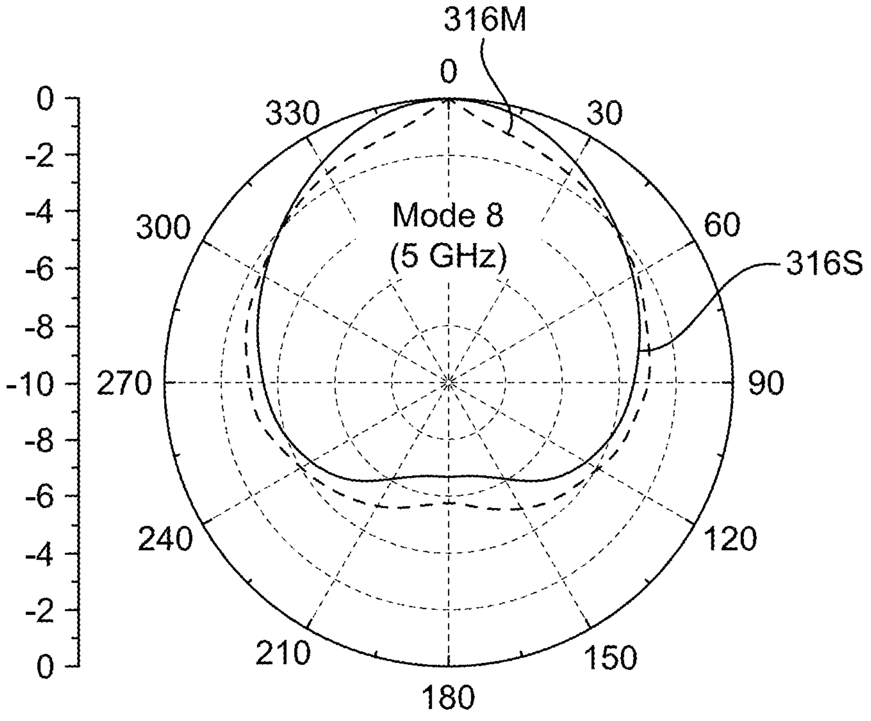
FIG. 3H is a graph illustrating simulated radiation pattern and a measured radiation pattern at an eight mode, according to certain embodiments.
Figure 3I:
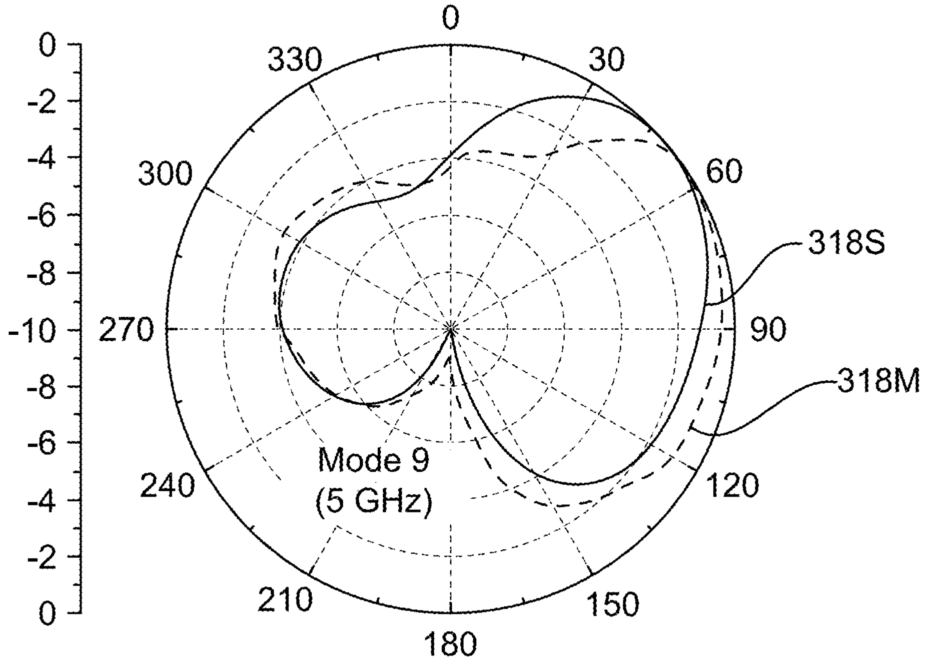
FIG. 3I is a graph illustrating simulated radiation pattern and a measured radiation pattern at an ninth mode, according to certain embodiments.
Figure 3J:
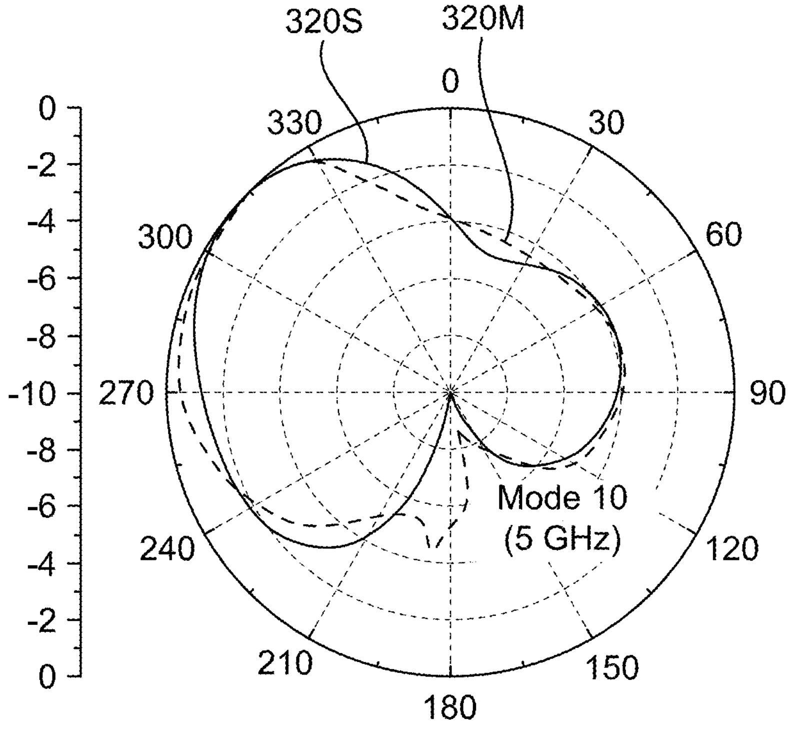
FIG. 3J is a graph illustrating simulated radiation pattern and a measured radiation pattern at a tenth mode, according to certain embodiments.
Figure 3K:
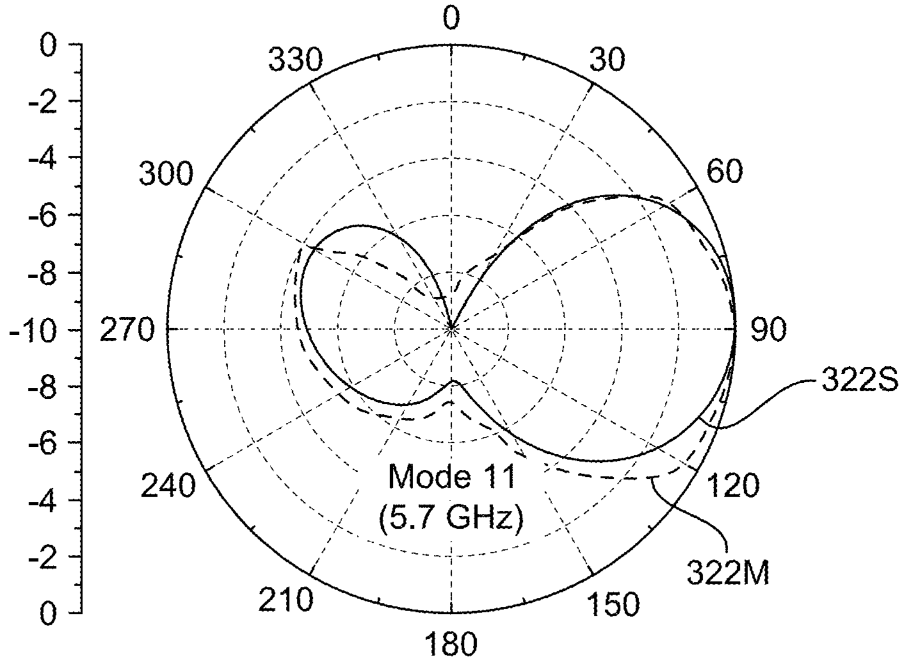
FIG. 3K is a graph illustrating simulated radiation pattern and a measured radiation pattern at an eleventh mode, according to certain embodiments.
Figure 3L:
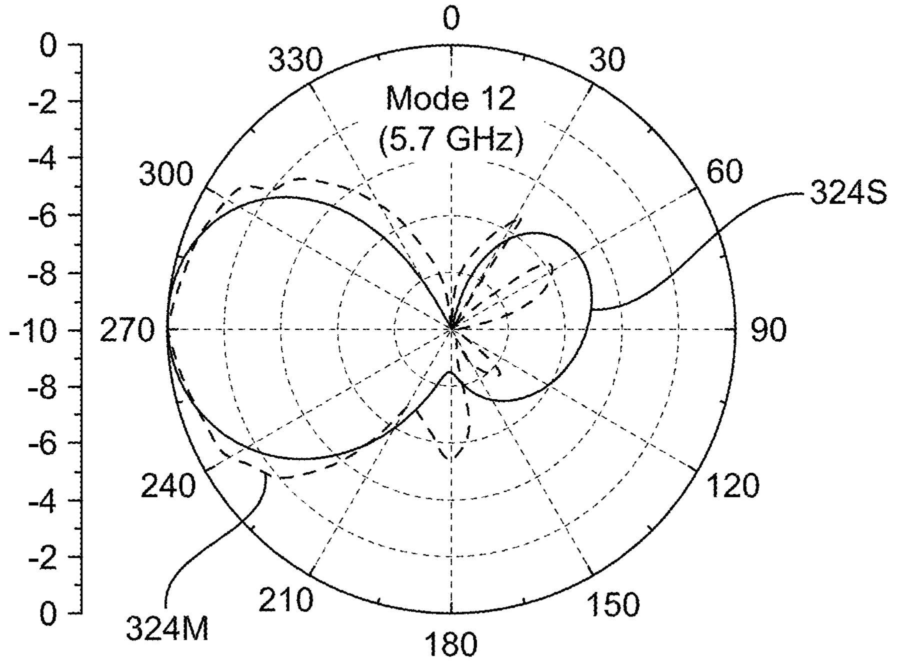
FIG. 3L is a graph illustrating simulated radiation pattern and a measured radiation pattern at a twelfth mode, according to certain embodiments.
Figure 4A:
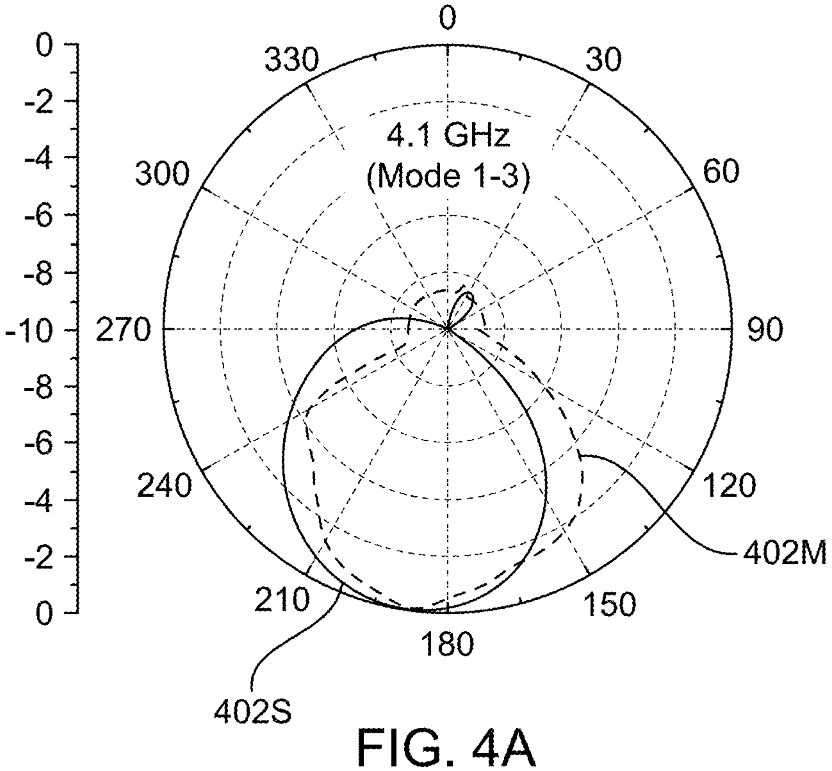
FIG. 4A is a graph illustrating simulated radiation pattern and a measured radiation pattern in the first mode, the second mode, and the third mode, according to certain embodiments.
Figure 4B:
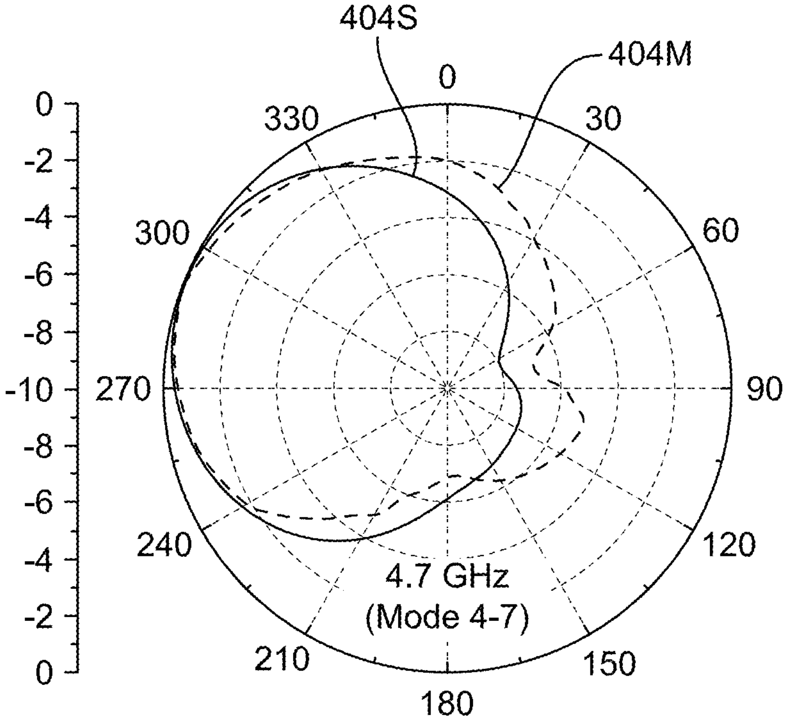
FIG. 4B is a graph illustrating simulated radiation pattern and a measured radiation pattern in the fourth mode, the fifth mode, the sixth mode and the seventh mode, according to certain embodiments.
Figure 4C:
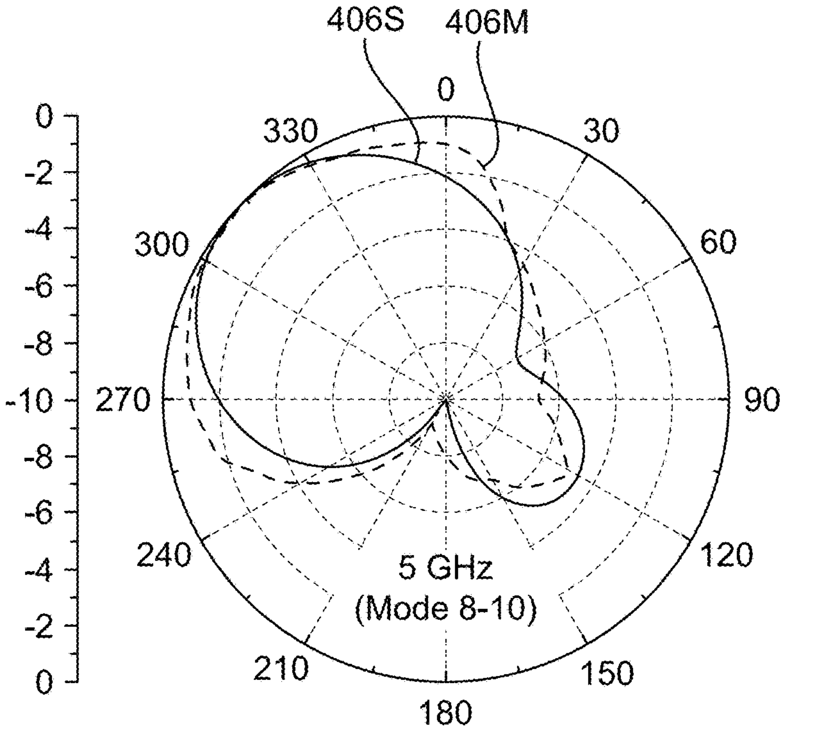
FIG. 4C is a graph illustrating simulated radiation pattern and a measured radiation pattern in the eighth mode, the ninth mode and the tenth mode, according to certain embodiments.
Figure 4D:
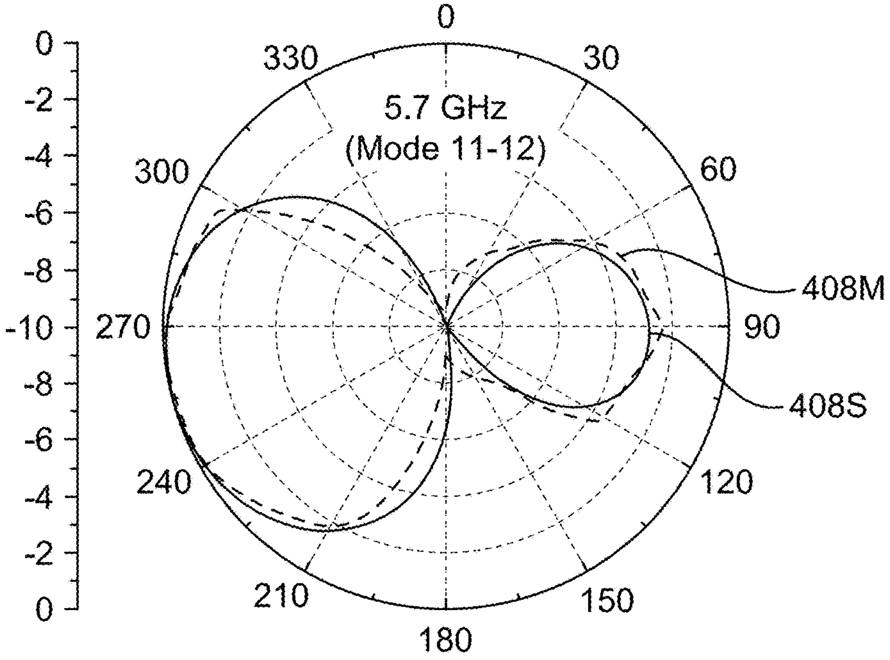
FIG. 4D is a graph illustrating simulated radiation pattern and a measured radiation pattern in the eleventh mode and the twelfth mode, according to certain embodiments.
Figure 5B:
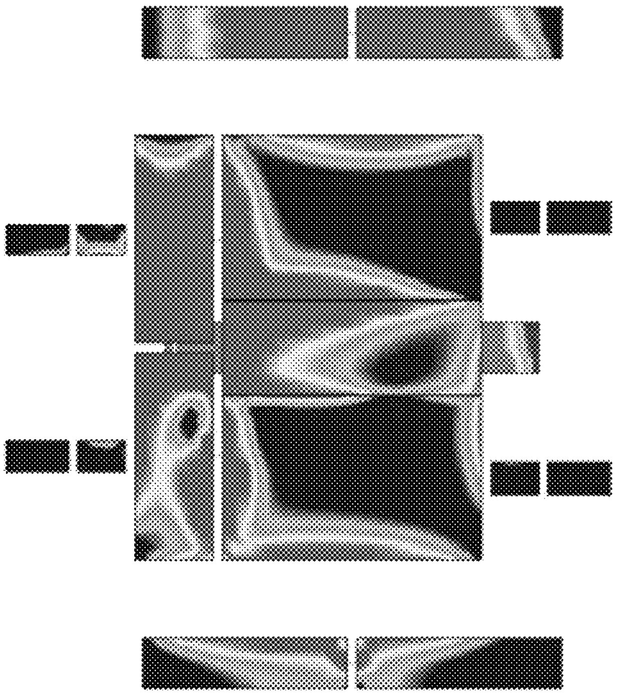
FIG. 5B illustrates a simulated surface current of the SPA at the fourth mode, according to certain embodiments.
Figure 5A:
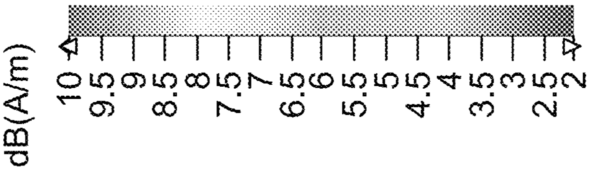
FIG. 5A illustrates a simulated surface current of the SPA at the third mode, according to certain embodiments.
Figure 5A:
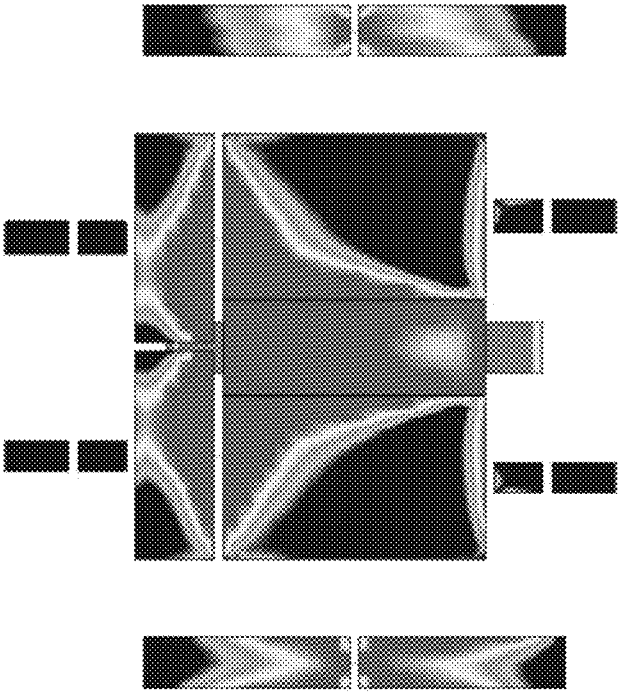
Figure 5D:
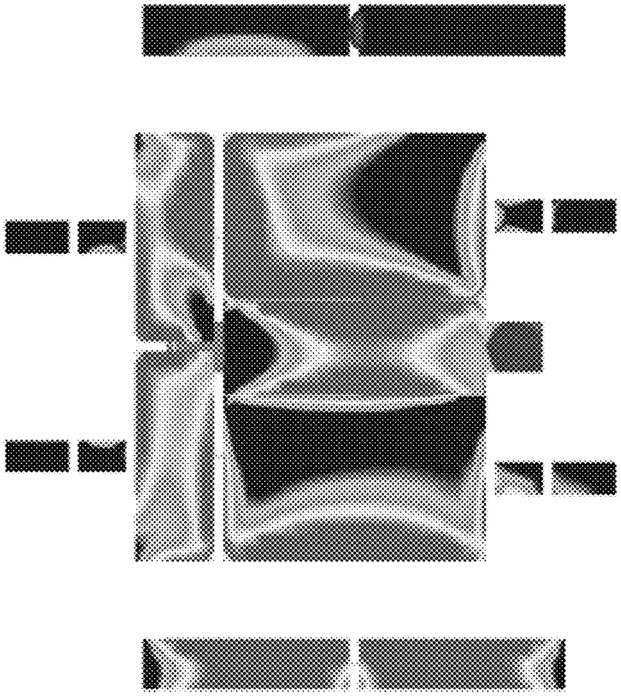
FIG. 5D illustrates a simulated surface current of the SPA at the twelfth mode, according to certain embodiments.
Figure 5C:
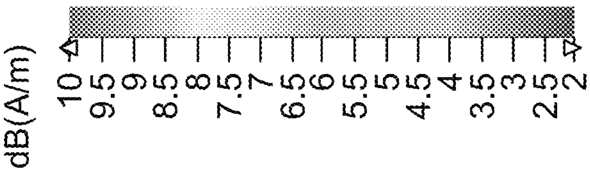
FIG. 5C illustrates a simulated surface current of the SPA at the eight mode, according to certain embodiments.
Figure 5C:
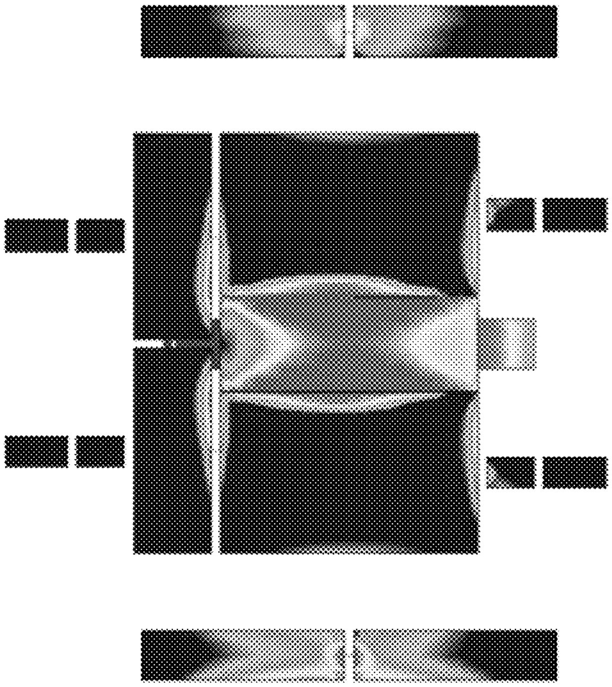

FIG. 2D illustrates a plurality of curves for a simulated reflection coefficient $S_{11}$ as well as measured reflection coefficients $S_{11}$ for the next two independent operational modes of the SPA 100, according to an embodiment of the present disclosure. The next two independent mode refers to an eleventh mode, a twelfth mode. Curves 222S and 222M accordingly illustrate simulated reflection coefficients $S_{11}$ and measured reflection coefficients $S_{11}$ for the eleventh mode, respectively. Curves 224S and 224M illustrate simulated reflection coefficients Sun and measured reflection coefficients Sun for the twelfth mode, respectively. Based upon the simulated reflection coefficients and the measured reflection coefficients using the plurality of curves, the SPA 100 appears to resonate at the resonating frequency approximately equal to 5.7 GHz.

With reference to FIG. 2A, FIG. 2B, FIG. 2C and FIG. 2D, the SPA 100 operates at twelve independent operational modes. By varying the electrical length using the third diode 120, the fourth diode 122, and the fifth diode 124 on the main rectangular patch segment 108, the SPA 100 is configured to achieve at least four different resonant frequencies of 4.1 GHz, 4.7 GHz, 5 GHz, and 5.7 GHz with measured impedance bandwidths of 16.8%, 10.5%, 15.4% and 12.8%, respectively. It was observed that the simulated and measured results agree considerably. Also, the relatively large bandwidth in all twelve modes is due to the presence of the first slot 110, the second slot 112 and the third slot 114 as well as the first slit 116 and the second slit 118 on the main rectangular patch segment 108. Accordingly, the current path is increased in the main rectangular patch segment 108 that supports in creating more resonances and increasing the bandwidth.

FIG. 3 illustrates a measured and a simulated radiation pattern of the SPA 100 in the H-Plane or X-Y plane for all twelve modes, according to an embodiment of the present disclosure. As such, FIG. 3A illustrates a curve 302S for simulated radiation pattern and a curve 302M for the measured radiation pattern in the first mode, that is, when all diodes are turned on, except the second diode 106. It was experimentally observed that the first mode radiates the radiation beam towards+143 degree in X-Y plane. FIG. 3B illustrates a curve 304S for simulated radiation pattern and a curve 304M for the measured radiation pattern in the second mode, that is, when all diodes are turned on, except the first diode 104. The SPA 100 radiates the radiation beam towards −143 degrees in X-Y plane. FIG. 3C illustrates a curve 306S for simulated radiation pattern and a curve 306M for the measured radiation pattern in the third mode, that is, when all diodes are turned On. The SPA 100 radiates the radiation beam towards+180 degree in X-Y plane. Based on the simulated and measured curves in FIG. 3A, FIG. 3B and FIG. 3C, the SPA 100 was experimentally observed to resonate at 4.1 GHz. FIG. 3D illustrates a curve 308S for the simulated radiation pattern and a curve 308M for the measured radiation pattern in the fourth mode, that is, when all diodes are turned on, except the fourth diode 122. The SPA 100 radiates the radiation beam towards+38 degree in X-Y plane. FIG. 3E illustrates a curve 310S for the simulated radiation pattern and a curve 310M for the measured radiation pattern in the fifth mode, that is, when all diodes are turned on, except the third diode 120. The SPA 100 radiates the radiation beam towards −38 degree in X-Y plane. FIG. 3F illustrates a curve 312S for simulated radiation pattern and a curve 312M for the measured radiation pattern in the sixth mode, that is, when all diodes are turned on, except the first diode 104 and the third diode 120. The SPA 100 radiates the radiation beam towards+63 degree in X-Y plane. FIG. 3G illustrates a curve 314S for simulated radiation pattern and a curve 314M for the measured radiation pattern in the seventh mode, that is, when all diodes are turned on, except the second diode 106 and the fourth diode 122. The SPA 100 radiates the radiation beam towards −63 degrees in X-Y plane. Based on the simulated and measured curves in FIG. 3D, FIG. 3E, FIG. 3F, and FIG. 3G the SPA 100 was experimentally observed to resonate at 4.7 GHz. FIG. 3H illustrates a curve 316S for simulated radiation pattern and a curve 316M for the measured radiation pattern in an eighth mode, that is, when all diodes are turned on, except the third diode 120 and the fourth diode 122. The SPA 100 radiates the radiation beam towards 0 degree in X-Y plane. FIG. 3I illustrates a curve 318S for simulated radiation pattern and a curve 318M for the measured radiation pattern in a ninth mode, that is, when all diodes are turned on, except the second diode 106, the third diode 120 and the fourth diode 122. The SPA 100 radiates the radiation beam towards+50 degree in X-Y plane. FIG. 3J illustrates a curve 320S for simulated radiation pattern and a curve 320M for the measured radiation pattern in a tenth mode, that is, when all diodes are turned off, except the second diode 106. The SPA 100 radiates the radiation beam towards −50 degree in X-Y plane. Based on the simulated and measured curves in FIG. 3H, FIG. 3I, and FIG. 3J, the SPA 100 was experimentally observed to resonate at 5 GHz. FIG. 3K illustrates a curve 322S for simulated radiation pattern and a curve 322M for the measured radiation pattern in an eleventh mode, that is, when all diodes are off, except the third diode 120 and the fifth diode 124. The SPA 100 radiates the radiation beam towards+90 degree in X-Y plane. FIG. 3L illustrates a curve 324S for simulated radiation pattern and a curve 324M for the measured radiation pattern in a twelfth mode, that is, when all diodes are off, except the fourth diode 122 and the fifth diode 124. The SPA 100 radiates the radiation beam towards+90 degree in X-Y plane. Based on the simulated and measured curves in FIG. 3K and FIG. 3L, the SPA 100 was experimentally observed to resonate at 5.7 GHz. The simulated and measured radiation patterns in H-planes almost superimpose each other. The minor differences in between the curves of the simulated and measured radiation patterns may be due to non-inclusion of the actual loss characteristics of the inductors, resistors, and capacitors while fabricating the SPA 100. Besides, soldering the diodes may result in some fabrication tolerances.

FIG. 4 illustrates a measured and simulated radiation pattern of the SPA 100 in the E-Plane or X-Z plane for all twelve modes. As such, FIG. 4A illustrates a curve 402S for simulated radiation pattern and a curve 402M for the measured radiation pattern in the first mode, the second mode, and the third mode. The switching angle was experimentally observed to be inclined at +82 degree in X-Z plane for all three modes whenever the SPA 100 resonates at 4.1 GHz. FIG. 4B illustrates a curve 404S for the simulated radiation pattern and a curve 404M for the measured radiation pattern in the fourth mode, the fifth mode, the sixth mode and the seventh mode. The switching angle was experimentally observed to be inclined at −67 degree in X-Z plane for all four modes whenever the SPA 100 resonates at 4.7 GHz. FIG. 4C illustrates a curve 406S for simulated radiation pattern and a curve 406M for the measured radiation pattern in the eighth mode, the ninth mode and the tenth mode. The switching angle was experimentally observed to be inclined at −47 degree in X-Z plane for all three modes whenever the SPA 100 resonates at 5 GHz. FIG. 4D illustrates a curve 408S for simulated radiation pattern and a curve 408M for the measured radiation pattern in the eleventh mode and the twelfth mode. The switching angle was experimentally observed to be inclined at −105 degree in X-Z plane for all three modes whenever the SPA 100 resonates at 5 GHz. Unlike FIG. 3A-FIG. 3L wherein twelve different beam tiles were observed in X-Y plane, only 4 beam tilts were observed in X-Z plane in FIG. 4A-FIG. 4D. The simulated and measured radiation patterns in E-planes also superimpose each other. The minor differences in between the curves of the simulated and measured radiation patterns may be due to non-inclusion of the actual loss characteristics of the inductors, resistors and capacitors while fabricating the SPA 100.

FIG. 5 illustrates a diagram to demonstrate a mechanism of the pattern reconfiguration based upon the surface current distributions of the SPA 100, according to an embodiment of the present disclosure. As such FIG. 5A illustrates a simulated surface current of the SPA 100 at mode 3. The diagram illustrates a surface current distribution when all the diodes are switched ON. High reflection is observed from the top of the SPA 100 as a result of an increase in the length of the main rectangular patch segment 108 at the top, hence, serving as reflector to divert all the radiations towards the lower hemisphere. Accordingly, the switching state diode of the permits an end fire (180 degree) beam tilt. FIG. 5B illustrates a simulated surface current of the SPA 100 at mode 4. When the fourth diode 122 is OFF, reflection occurs towards the right direction, making most of the surface currents gravitate towards the right, at an angle of 38 degree. FIG. 5C illustrates a simulated surface current of the SPA 100 at eighth mode. When the third diode 120 and the fourth diode 122 are switched OFF, most of the current moves in the broadside direction (0 degree) since only the two parasitic lines act as reflector. FIG. 5D illustrates a simulated surface current of the SPA 100 at twelfth mode. The SPA 100 is reflected towards the left when the fourth diode 122 and the fifth diode 124 are switched ON while the other diodes are OFF. This is because the right part of the SPA 100 now acts as a reflector, and therefore, diverts most of the currents towards the left.

Based upon FIG. 1, FIG. 2, FIG. 3, FIG. 4, and FIG. 5, Table I summarizes all twelve independent modes and the frequency reconfiguration of the SPA 100 whereas Table II shows the performance of the SPA 100. The SPA 100 permits to operate twelve different switching modes depending on the ON or OFF states of all five diodes. The efficiency of the SPA 100 was obtained by the inventors based upon the simulated model of the SPA as well as based upon the prototype model of the SPA 100. The frequency of the SPA 100 is reconfigurable in four resonating bands. The simulated efficiency of the SPA ranges between 44.5%-95%, while the measured efficiency ranges between 42%-92%. Also, the inventors determined the simulated and measured gain to range between 1.97-4.3 dB and 1.7-4.2 dB, respectively. The measured efficiency and gain exhibit slight decrease because of the fabrication tolerances and the actual values of the inductors, resistors and capacitors used while fabricating the SPA 100. Also, the radiation pattern is reconfigurable in twelve different operating modes. Lowest efficiency (42%) of the SPA 100 was seen at 4.1 GHz resonance band whereas the highest efficiency (92%) of the SPA 100 is seen when the SPA 100 is configured to transmit at 5 GHz or the resonance frequency is 5 GHz. At resonance frequencies of 4.7 GHz and 5.7 GHz, the SPA 100 radiates with 78% and 88% efficiency, respectively. Moreover, throughout the twelve operating modes, the SPA 100 exhibits a relatively large common bandwidth as a result of the 3 slots and 2 slits. Based upon the overall efficiency of the SPA 100 at all twelve different operating modes at four different resonating bands, the measured efficiency of the SPA 100 was experimentally obtained by the inventors as 77%, throughout the twelve independent modes.

TABLE I

Operating modes of the proposed SPA antenna

| Modes | Diodes $D_1$ | $D_2$ | $D_3$ | $D_4$ | $D_5$ | Resonant Freq (GHz) | Scan Angles (°) |
|---|---|---|---|---|---|---|---|
| 1 | 1 | 0 | 1 | 1 | 1 | 4.1 | +143 |
| 2 | 0 | 1 | 1 | 1 | 1 | | −143 |
| 3 | 1 | 1 | 1 | 1 | 1 | | +180 |
| 4 | 1 | 1 | 1 | 0 | 1 | 4.7 | +38 |
| 5 | 1 | 1 | 0 | 1 | 1 | | −38 |
| 6 | 1 | 0 | 1 | 0 | 1 | | +63 |
| 7 | 0 | 1 | 0 | 1 | 1 | | −63 |
| 8 | 1 | 1 | 0 | 0 | 0 | 5.0 | 0 |
| 9 | 1 | 0 | 0 | 0 | 0 | | +50 |
| 10 | 0 | 1 | 0 | 0 | 0 | | −50 |
| 11 | 0 | 0 | 1 | 0 | 1 | 5.7 | +90 |
| 12 | 0 | 0 | 0 | 1 | 1 | | −90 |

TABLE II

Performance of the proposed SPA

| Frequency | Modes | Scan angle | Efficiency (Simu./Meas.) (%) | Gain (Simu./Meas.) (dB) | Common bandwidth (%) |
|---|---|---|---|---|---|
| 4.1 GHz | 1 | 143° | 44.5/42 | 2.34/2.2 | 4.7 |
| | 2 | −143° | 44.5/42 | 2.34/2.2 | |
| | 3 | 180° | 45/42 | 1.97/1.7 | |
| 4.7 GHz | 4 | 38° | 81/78 | 3.32/3.4 | 5.3 |
| | 5 | −38° | 81/78 | 3.32/3.4 | |
| | 6 | 63° | 81/78 | 3.81/3.7 | |
| | 7 | −63° | 81/78 | 3.81/3.7 | |
| 5.0 GHz | 8 | 0° | 95/92 | 3.8/3.7 | 5.0 |
| | 9 | 50° | 95/92 | 4.3/4.2 | |
| | 10 | −50° | 95/92 | 4.3/4.2 | |
| 5.7 GHz | 11 | 90° | 89/88 | 3.8/3.9 | 13.9 |
| | 12 | −50° | 89/88 | 3.8/3.9 | |

The SPA 100 operates with an average gain of 3 dBi throughout the twelve independent modes based upon the simulated as well as prototype model of the SPA 100. Also, the average bandwidth of 13.9 GHz was obtained through the SPA 100 by the inventors based upon the experimental calculations. Moreover, the area of the SPA 100 is 50 mm(±5 mm, preferably ±2 mm)×50 mm (±5 mm, preferably ±2 mm) or less than 55×55 $mm^2$. It is obvious that the SPA 100 has a simple antenna size, more operational modes, better average efficiency, moderately average gain, and comparatively better average bandwidth compared to all the antennas developed in the prior art. This makes the SPA 100 a viable choice for WiMAX applications.

TABLE III

Comparison between the SPA of the present disclosure and conventional patch antennas.

| Year/Ref | Antenna size (mm2) | No. of operational 1 modes | Resonance Freq. (Ghz) | No. of Switches | Average Efficiency (%) | Average Gain (dB) | Average Bandwidth (%) |
|---|---|---|---|---|---|---|---|
| 2014[1] | 130 × 160 | 9 | 1.82, 1.93, 2.1 | 14 | 85 | 4.6 | 8.3 |
| 2017[2] | 40 × 40 | 8 | 2.95, 3.76, 4, 5.1 | 2 mech. SW. | 71 | 4.27 | 6 |
| 2016[3] | 85 × 85 | 6 | 2.68, 3, 3.51 | 2 varactors | 67 | 4.05 | — |
| 2015[4] | 45.8 × 80 | 4 | 2.4, 5.4 | 5 | 65.5 | 2.6 | 19.05 |
| 2017[5] | 50 × 50 | 7 | 4.5, 4.8, 5.2, 5.8 | 4 | 80 | 3.57 | 2.6 |
| 2015[6] | 120 × 120 | 6 | 2.6, 3.5 | 12 | 95.6 | 9.07 | 3.8 |
| 2018[7] | 151.5 × 160.9 | 9 | 2.15, 2.27, 2.38 | 2 varactors | 64 | 7.1 | 1.5 |
| 2018[8] | 50 × 60 | 4 | 5.2, 5.8 | 6 | 84 | 2.75 | 3.55 |
| Present Disclosure | 50 × 50 | 12 | 4.1, 4.7, 5.0, 5.7 | 5 | 76.75 | 3.0 | 13.9 |

REFERENCES FOR TABLE III

1. H. A. Majid, M. K. A. Rahim, M. R. Hamid, and M. F. Ismail, "Frequency and pattern reconfigurable slot antenna," IEEE Transactions on Antennas and Propagation, vol. 62, no. 10, pp. 5339-5343, October 2014.
2. A. Boukarkar, X. Q. Lin, Y. Jiang, and X. F. Yang, "A compact frequency-reconfigurable 36-states patch antenna for wireless applications," IEEE Antennas and Wireless Propagation Letters, vol. 17, no. 7, pp. 1349-1353, July 2018.
3. N. Nguyen-Trong, L. Hall, and C. Fumeaux, "A frequency- and pattern reconfigurable center-shorted microstrip antenna," IEEE Antennas and Wireless Propagation Letters, vol. 15, pp. 1955-1958, 2016.
4. P. K. Li, Z. H. Shao, Q. Wang, and Y. J. Cheng, "Frequency- and pattern reconfigurable antenna for multi standard wireless applications," IEEE Antennas and Wireless Propagation Letters, vol. 14, pp. 333-336, 2015.
5. Y. P. Selvam, M. Kanagasabai, M. G. N. Alsath, S. Velan, S. Kingsly, S. Subbaraj, Y. V. Ramana Rao, R. Srinivasan, A. K. Varadhan, and M. Karuppiah, "A low-profile frequency- and pattern-reconfigurable antenna," IEEE Antennas and Wireless Propagation Letters, vol. 16, pp. 3047-3050, 2017.
6. N. Ramli, M. T. Ali, M. T. Islam, A. L. Yusof, and S. Muhamud-Kayat, "Aperture-coupled frequency and patterns reconfigurable microstrip stacked array antenna," IEEE Transactions on Antennas and Propagation, vol. 63, no. 3, pp. 1067-1074, March 2015.
7. S. N. M. Zainarry, N. Nguyen-Trong, and C. Fumeaux, "A frequency and pattern-reconfigurable two-element array antenna," IEEE Antennas and Wireless Propagation Letters, vol. 17, no. 4, pp. 617-620, April 2018.
8. Y. P. Selvam, L. Elumalai, M. G. N. Alsath, M. Kanagasabai, S. Subbaraj, and S. Kingsly, "Novel frequency- and pattern-reconfigurable rhombic patch antenna with switchable polarization," IEEE Antennas and Wireless Propagation Letters, vol. 16, pp. 1639-1642, 2017.

Embodiments of the disclosure are illustrated with respect to FIG. 1-FIG. 5. The embodiments describe a segmented patch antenna (SPA) for a WiMAX related application. The SPA 100 includes two rectangular parasitic elements 102 wherein each parasitic element comprising an integrated diode. The SPA 100 further includes a main rectangular patch segment 108. The main rectangular patch segment 108 comprising 3 slots, 2 slits and 3 diodes. The SPA 100 is suitable for use in multiple frequencies between 4.1 GHz and 5.7 GHz inclusive and configurable to operate in 12 independent modes In an aspect, the SPA 100 further includes four biasing lines, that is, the first biasing line 126, the second biasing line 128, the third biasing line 130 and the fourth biasing line 132, each of length 6 mm (±1.0 mm), and width 2 mm (±1.0 mm).

In an aspect, the four biasing lines each include a limiting resistor (that is, the first limiting resistor 126R, the second limiting resistor 128R, the third limiting resistor 130R and the fourth limiting resistor 132R) and a choke inductor (that is, the first choke inductor 126L, the second choke inductor 128L, the third choke inductor 130L and the fourth choke inductor 132L).

In an aspect, the SPA 100 supports at least four frequency bands.

In an aspect, the SPA 100 is reconfigurable to 12 independent modes.

In an aspect, the SPA 100 has efficiency of at least 92% while configured to transmit at 5 GHz.

In an aspect, the SPA 100 operates with average gain of 3 dBi throughout the twelve independent modes.

In an aspect, the SPA 100 operates with average efficiency of 77%, throughout the 12 independent modes.

In an aspect, the SPA 100 includes a back view 100B wherein the back view 100B includes a partial ground 138 with one dimension 3 mm(±0.5 mm), and a second dimension 23.5 mm (±1.5 mm).

In an aspect, the back view 100B further includes a coaxial feed 140 that is placed between 11 mm (±1.0 mm). mm from the top of the partial ground 138.

In an aspect, the SPA 100 is less than 50 mm(±5.0 mm).×50 mm(±5.0 mm). in area.

To this end, the present disclosure describes a compact frequency and pattern reconfigurable segmented path antenna (SPA). The SPA includes 2 slits, 3 slot and 3 integrated PIN diodes in the slots to increase or decrease the length of the main rectangular patch segment in order to perform frequency reconfiguration. The SPA further includes two integrated diodes in the rectangular parasitic element in order to achieve pattern reconfiguration using the Yagi-Uda principle. The SPA therefore exhibits twelve operational modes in four frequency band merely by using five PIN diodes. Further, the SPA has a miniaturized structure having size less than 55×55 $mm^2$. The SPA is simple to manufacture that makes the SPA best suited for WiMAX related applications.

Obviously, numerous modifications and variations of the present disclosure will be apparent to the person skilled in the art in light of the above description. For example, the shape of the main rectangular patch segment and the parasitic element may be circular, semi-circular, or triangular. Also, the length and width of the main rectangular patch segment and the parasitic element may have a certain tolerance value compared to the values used in the present disclosure. It is therefore to be understood that within the scope of the appended claims, the disclosure may be practiced otherwise than as specifically described herein.

The invention claimed is:

1. A PTFE based segmented patch antenna, comprising:
a PTFE substrate having a dielectric constant value of from 2.2 to 2.4,
wherein the PTFE substrate has a top side and a bottom side, wherein the top side comprises a conductive sheet disposed over the PTFE substrate, the conductive sheet comprising a main rectangular patch segment,
the main rectangular patch segment comprising:
a first slot, a second slot, a third slot, a first slit, a second slit, and 3 diodes,
wherein the diodes are connected across each of the slots,
wherein the first slit is connected to and perpendicular to the first slot and the second slit is connected to and perpendicular to the second slot, and
wherein the top side of the segmented patch antenna further comprises two rectangular parasitic elements each parasitic element further having an additional integrated diode,
wherein the segmented patch antenna is configurable to operate in 12 independent modes by turning on or off the diodes.

2. The segmented patch antenna of claim 1, further comprising 4 biasing lines, each of length between 7 and 8 mm and width between 1 and 3 mm.

3. The segmented patch antenna of claim 2, wherein each of the 4 biasing lines include a limiting resistor and a choke inductor.

4. The segmented patch antenna of claim 1, wherein the main rectangular patch segment has one edge of length between 26 and 28 mm and a second edge of length between 21 and 23 mm.

5. The segmented patch antenna of claim 1, wherein the slots are of width no larger than 0.7 mm and the slits are no larger than 0.11 mm.

6. The segmented patch antenna of claim 1, wherein each of the two rectangular parasitic elements have one dimension between 26 and 28 mm and another dimension between 2.5 and 3.5 mm.

7. The segmented patch antenna of claim 1, wherein the rectangular parasitic elements are located at one quarter wavelength from the center on each side of the main patch segment wherein an average of quarter wavelengths of each frequency is used to calculate the location of the parasitic elements.

8. The segmented patch antenna of claim 1, wherein the rectangular parasitic elements are located between 18 and 19 mm from the center of the main rectangular patch segment.

9. The segmented patch antenna of claim 1, wherein each of the two rectangular parasitic elements are separated into two sections by pin diodes D1 and D2.

10. The segmented patch antenna of claim 9, wherein a length of the rectangular parasitic elements is configurable by turning on or off the diodes.

11. The segmented patch antenna of claim 9, wherein the parasitic elements are reconfigurable to act as a reflector or as a director according to settings of the diodes and a Yagi-Uda principle.

12. The segmented patch antenna of claim 1, wherein three pin diodes D3, D4 and D5 are integrated on the 3 slots of the main rectangular patch segment in order to vary a length of the main rectangular patch thereby varying a resonance frequency of the antenna.

13. The segmented patch antenna of claim 1, which supports at least 4 frequency bands between 4.1 GHz and 5.7 GHz inclusive.

14. The segmented patch antenna of claim 1, with efficiency of at least 92% while configured to transmit at 5 GHz.

15. The segmented patch antenna of claim 1 that operates with average gain of 3 dBi throughout the 12 independent modes.

16. The segmented patch antenna of claim 1 that operates with average efficiency of 77%, throughout the 12 independent modes.

17. The segmented patch antenna of claim 1, wherein the bottom side comprises a partial ground with one dimension between 2.5 and 3.5 mm and a second dimension between 22 and 25 mm.

18. The segmented patch antenna of claim 17, which further comprises a coaxial feed disposed 10-12 mm from a top of the partial ground.

19. The segmented patch antenna of claim 1, wherein the top side of the segmented patch antenna is less than 55×55 $mm^2$ in area.

* * * * *